(12) United States Patent
Bera

(10) Patent No.: US 7,136,891 B2
(45) Date of Patent: Nov. 14, 2006

(54) ARITHMETIC AND RELATIONAL OPERATIONS

(75) Inventor: Rajendra K. Bera, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/317,340

(22) Filed: Dec. 12, 2002

(65) Prior Publication Data

US 2004/0117415 A1  Jun. 17, 2004

(51) Int. Cl.
*G06F 7/38* (2006.01)
(52) U.S. Cl. .................................. 708/490
(58) Field of Classification Search ......... 708/490
See application file for complete search history.

(56) References Cited

U.S. PATENT DOCUMENTS

| | | | | |
|---|---|---|---|---|
| 5,603,031 A | * | 2/1997 | White et al. ............... 719/317 |
| 5,793,371 A | * | 8/1998 | Deering ..................... 345/418 |
| 6,598,186 B1 | * | 7/2003 | McGuire et al. ............. 714/48 |
| 6,618,719 B1 | * | 9/2003 | Andrei ........................ 707/2 |
| 2002/0078431 A1 | * | 6/2002 | Reps ......................... 717/100 |

\* cited by examiner

*Primary Examiner*—Tan V. Mai
(74) *Attorney, Agent, or Firm*—Anthony V. S. England; R. Rao Coca

(57) ABSTRACT

In a method of carrying out arithmetic and relational operations on decimal numerals of arbitrary size, the operations produce exact results if the decimal numerals involved are terminating or repeating. The result of arithmetic operations is flagged to indicate whether the result is a terminating or a repeating numeral. To maintain computational accuracy, numbers are converted to rational fractions, whenever necessary and computations are performed using such fractions. The sign, decimal point, and digits comprising a number are treated as individual character symbols. All arithmetical and relational operations are performed on character strings, rather than on binary maps of the relevant numbers.

23 Claims, 60 Drawing Sheets

```
int GCD(int u, int v)
{
    // Euclid's algorithm for calculating
    // the greatest common divisor.
    // The algorithm assumes u >= 0 and v >= 0 with
    // at least one of them non-zero.

int t;
    while (u > 0) {
        if (u < v) { t = u;  u = v;  v = t; }
        u = u - v;
    }
    return v;                    // v returns the GCD.
}
```

FIG. 23

```
// Compare a and b. The comparison result is returned in r.
// r = 0 if a = b, r = -1 if a < b, r = 1 if a > b.
// aL is the block length of repeating digits in a,
// bL is the block length of repeating digits in b.

int i, r, aL, bL;
Real a, b;

if (a[0] == '+' && b[0] == '-') return r = 1;
if (a[0] == '-' && b[0] == '+') return r = -1;

i = 0;
r = 0;
while (a[++i]) {
   if (a[i] > b[i]) { r = 1; break; }
   else if (a[i] < b[i]) { r = -1; break; }
}

// Account for repeating numerals.

if (r == 0) {
    if (aL > 0 && bL == 0) r = 1;
    else if (aL == 0 && bL > 0) r = -1;
  } if (a[0] == '-') return -r;
  else return r;
```

FIG. 24

_REAL. H - page 1/3

```
// _REAL.H
// Programmed by Dr. Rajendra K. Bera
// 04 April 2001 (coding commenced)

class Real {
  private:
    char *name;
    char *re;
    int  dec_at;    // Zeroth char of re is a sign.
    int  size;
    char *num;      // numerator of rational fraction of re.
    char *denom;    // denominator of rational fraction of re.
    int  rlen;      // block length of recurring decimal digits.

// Misc functions int   IsReal(char *val) const;
    char *FmtReal(char *val) const;
    int   CmpReal(char *a, char *b) const;
    void  FormNumerator(Real &a) const;
    void  FormDenominator(Real &a) const;
    Real  FormRatio(Real &a) const;

public:
    // Constructors.  ----------------
    Real(char *VarName = "noname", char *val = "0");
    Real(char *VarName, const Real &real);
    Real(const Real &real);
```

FIG. 25

_ REAL. H - page 2/3

```
// DESTRUCTOR.   ------------------
~Real();

// ACCESSORS.   -------------------
char *Get_name() const;
char *Get_re() const;
int  Get_dec_at() const;
int  Get_size() const;
char *Get_num() const;
char *Get_denom() const;
int  Get_rlen() const;

void Rename(char *NewVarName);
void Reset_re(char *val, int L = 0);
void Reset_num(char *n);
void Reset_denom(char *d);

// Assignments operators. ---------
const Real &operator=  (const Real &real);
const Real &operator=  (const char *strg);
const Real &operator+= (const Real &real);
const Real &operator-= (const Real &real);
const Real &operator*= (const Real &real);
const Real &operator/= (const Real &real);

// Other operators. --------------
int operator== (const Real &real) const;
int operator!= (const Real &real) const;
int operator>  (const Real &real) const;
int operator>= (const Real &real) const;
int operator<  (const Real &real) const;
int operator<= (const Real &real) const;
```

FIG. 26

_ REAL. H - page 3/3

```
friend Real operator+ (const Real &a, const Real &b);
friend Real operator+ (const Real &a);
friend Real operator- (const Real &a, const Real &b);
friend Real operator- (const Real &a);
friend Real operator* (const Real &a, const Real &b);
friend Real operator/ (const Real &a, const Real &b);

// Other functions. ---------------
friend Real GCD(const Real &a, const Real &b);
friend Real ExecFormRatio(Real &a);
friend int  IsZero(const Real &a);
```

FIG. 27

_REAL. CPP - page 1/33

```cpp
// _REAL.CPP
// Programmed by Dr. Rajendra K. Bera
// 04 April 2001 (coding commenced)

#include <ctype.h>
#include <graphics.h>
#include <math.h>
#include <mem.h>
#include <stdio.h>
#include <stdlib.h>
include <string.h> include <_def.h>
include <_gvars.h>
include <_real.h> include <in_out.h>
include <msg.h>
#include <strg.h>

// Functions not listed in _REAL.H but called in the module
// _REAL.CPP belong to other modules. What such functions
// do is usually evident from their call names.
```

FIG. 28

_REAL. CPP - page 2/33

```cpp
// Misc functions.
int Real::IsReal(char *val) const
{
  // Assumes a trimmed Real number with a sign, a decimal point,
  // no leading zeros, and no trailing zeros.

int Cond = TRUE, i = 1;
  char *p = strchr(val+1, (int)'.');

if (val[0] != '+' && val[0] != '-') Cond = FALSE;
  if (!p) Cond = FALSE;
  if (strchr(++p, (int)'.'))
    Cond = FALSE;      // More than one decimal point.
  while(isdigit(val[i]) || val[i] == '.') i++;
  if (!Cond) _Fatal(val, "is not a real number");
  return TRUE;
} char *Real::FmtReal(char *val) const
{
  // val is not modified by this function.
  // The formatted val is returned in the static variable t.

static char *t = NULL;
  char *p = strchr(val, (int)'.'), *s;
  int i, n;

s = strdup(val);
  if (t) delete[] t;
  t = new char[strlen(val)+3];
  if (!s || !t) NoMemory();
```

FIG. 29

_REAL.CPP - page 3/33

```cpp
    RmStrgBlanks(s);
    if (s[0] != '+' && s[0] != '-') {   // Put sign, if needed.
       t[0] = '+';
       strcpy(t+1, s);
    }
    else strcpy(t, s);
    free(s);

if (!p) {                           // Put decimal point, if needed.
       n = strlen(t);
       *(t + n) = '.';
       *(t + n + 1) = '\0';
    } i = strlen(t) - 1;                  // Remove trailing zeros.
    while (t[i] == '0') t[i--] = '\0';

i = 1;                              // Remove leading zeros.
    while (t[i] == '0') i++;
    t[--i] = t[0];

IsReal(t+i);
    return t+i;
}
```

FIG. 30

_REAL. CPP - page 4/33

```
int  Real::CmpReal(char *a, char *b) const
{
  char *sa, *sb, *ta, *tb, *u, *v;
  int d, i, n, n1, n2, r;

sa = strdup(FmtReal(a));
  sb = strdup(FmtReal(b));
  if (!sa || !sb) NoMemory();

if (*sa == '+' && *sb == '-') return 1;
  if (*sa == '-' && *sb == '+') return -1;

u = strchr(sa, (int)'.');
  v = strchr(sb, (int)'.');
  n1 = max((int)(strchr(sa, (int)'.') - sa),(int)(strchr(sb,
       (int)'.') - sb));
  n2 = max(strlen(u), strlen(v));
  n = n1 + n2;

// Create temporary buffers ta, tb for a, b and zero buffers.

ta = new char[n];
  tb = new char[n];
  if (!ta || !tb) NoMemory();

r = n;
  while (r--) {
     ta[r] = '0';
     tb[r] = '0';
  }
  ta[0]    = sa[0];
```

FIG. 31

_ REAL. CPP - page 5/33

```
    tb[0]   = sb[0];
    ta[n-1] = '\0';
    tb[n-1] = '\0';

// Copy sa, sb into ta, tb aligning their decimal point.

i = 0;
    d = n1 - (int)(u - sa);
    while (sa[i++]) ta[i+d] = sa[i];

i = 0;
    d = n1 - (int)(v - sb);
    while (sb[i++]) tb[i+d] = sb[i];
    free(sa);
    free(sb);

// Compare ta and tb.

i = 0;
    r = 0;
    while (ta[++i]) {
        if (ta[i] > tb[i]) { r = 1; break; }
        else if (ta[i] < tb[i]) { r = -1; break; }
    } if (ta[0] == '-') r = -r;

delete[] ta;
    delete[] tb;
    return r;
}
```

FIG. 32

_REAL. CPP - page 6/33

```cpp
void Real::FormNumerator(Real &a) const
{
   // a.re[k] = '.'
   // a.re[m] = first digit of repeating block of digits.
   // L is the length of the block of repeating digits.
   // Assume ONLY one block of repeating digits will be present.
   // The sign of a is carried by Num.

int k = a.dec_at, n = strlen(a.re) - 1;
   char *Num = strdup(a.re);
   Real b("b"), c("c");

if (!Num) NoMemory();
   if (Num[n] != '.') {
      memmove(Num+k, Num+k+1, n-k);
      Num[n] = '.';
   } b.Reset_re(Num);
   Num[n-L] = '.';
   Num[n-L+1] = '\0';
   c.Reset_re(Num);
   b -= c;
   a.Reset_num(b.re);
   free(Num);
   return;
} void Real::FormDenominator(Real &a) const
{
   // a.re[k] = '.'
   // a.re[m] = first digit of repeating block of digits.
```

FIG. 33

_REAL.CPP - page 7/33

```cpp
// L is the length of the block of repeating digits.
// Assumed ONLY one block of repeating digits will be present.
// The sign of a is carried by the numerator.

int k = a.dec_at, L = a.rlen, m = strlen(a.re) - L;
int i, n, n1 = m - k + L, n2 = m - k;
char *s1, *s2;
Real a1("a1"), a2("a2");

if (L == 0) {
    n = strlen(a.re+k+1); // Number of digits after dec. point.
    s1 = new char[n+2];
    if (!s1) NoMemory();
    s1[0] = '1';
    s1[n+1] = '\0';
    i = n+1;
    while (--i) s1[i] = '0';
    a1.Reset_re(s1);
    delete[] s1;
}
else {
    s1 = new char[n1+2];
    s2 = new char[n2+2];
    if (!s1 || !s2) NoMemory();

_ REAL. CPP - page 8/33

```
    i = n1+1;   while(--i) s1[i] = '0';
    i = n2+1;   while(--i) s2[i] = '0';

a1.Reset_re(s1);
    a2.Reset_re(s2);
    delete[] s1;
    delete[] s2;

a1 -= a2;
  } delete[] a.denom;
  a.denom = new char[strlen(a1.denom)+1];
  if (!a.denom) NoMemory();
  strcpy(a.denom, a1.re);
  return;
}

Real Real::FormRatio(Real &a) const
{
  Real g("g"), u("u", a), v("v", a);

FormNumerator(a);
  FormDenominator(a);

u.Reset_re(a.num);
  v.Reset_re(a.denom);
  g = GCD(u, v);
```

FIG. 35

_ REAL. CPP - page 9/33

```
  u /= g;
  v /= g;
  a.Reset_num(u.re);
  a.Reset_denom(v.re);
  return a;
}

// CONSTRUCTORS.  ----------------

// Make default Real or Copy value to a Real.
Real::Real(char *VarName, char *val)
{
  char *p = FmtReal(val);

re = new char[size = strlen(p)+1];
  name = new char[strlen(VarName)+1];
  num = new char[1];
  denom = new char[1];
  if (!name || !re || !num || !denom) NoMemory();

TrimStrgLR(strcpy(name, VarName));
  strcpy(re, p);
  dec_at = (int)(strchr(re, (int)'.') - re);
  *num = '\0';
  *denom = '\0';
  rlen = 0;
}
```

FIG. 36

_REAL. CPP - page 10/33

```cpp
// Copy a Real.
Real::Real(char *VarName, const Real &real)
{
  name = new char[strlen(VarName)+1];
  re = new char[real.size];
  num = new char[strlen(real.num)+1];
  denom = new char[strlen(real.denom)+1];
  if (!name || !re || !num || !denom) NoMemory();

TrimStrgLR(strcpy(name, VarName));
  strcpy(re, real.re);
  dec_at = real.dec_at;
  size = real.size;
  strcpy(num, real.num);
  strcpy(denom, real.denom);
  rlen = real.rlen;
}

// Copy constructor.
Real::Real(const Real &real)
{
  int n = strlen(real.name) + 4;
  char *namestrg = new char[n];
  if (!namestrg) NoMemory();
  Sprintf(namestrg, n, "# %s", real.name);

name = new char[strlen(namestrg)+1];
  re = new char[real.size];
  num = new char[strlen(real.num)+1];
  denom = new char[strlen(real.denom)+1];
  if (!name || !re || !num || !denom) NoMemory();
```

FIG. 37

_REAL. CPP - page 11/33

```
    TrimStrgLR(strcpy(name, namestrg));
    strcpy(re, real.re);
    dec_at = real.dec_at;
    size = real.size;
    delete[] namestrg;
    strcpy(num, real.num);
    strcpy(denom, real.denom);
    rlen = real.rlen;
}

// DESTRUCTOR.  ------------------
Real::~Real()
{
    delete[] name;
    delete[] re;
    delete[] num;
    delete[] denom;
}

// ACCESSORS.  ------------------- char *Real::Get_name() const
{ return name; } char *Real::Get_re() const
{ return re; } int Real::Get_dec_at() const
{ return dec_at; }
```

FIG. 38

_REAL. CPP - page 12/33

```
int Real::Get_size() const
{ return size; } char *Real::Get_num() const
{ return num; } char *Real::Get_denom() const
{ return denom; } int Real::Get_rlen() const
{ return rlen; } void Real::Rename(char *NewVarName)
{
  delete[] name;
  name = new char[strlen(NewVarName)+1];
  if (!name) NoMemory();
  TrimStrgLR(strcpy(name, NewVarName));
} void Real::Reset_re(char *val, int L)
{
  char *t = FmtReal(val);

delete[] re;
  re = new char[size = strlen(t)+1];
  if (!re) NoMemory();
  strcpy(re, t);
  dec_at = (int)(strchr(re, (int)'.') - re);
```

FIG. 39

_REAL. CPP - page 13/33

```
    *denom = '\0';
    *num = '\0';
    rlen = L;
  } void Real::Reset_num(char *n)
  {
    delete[] num;
    num = new char[strlen(n)+1];
    if (!num) NoMemory();
    strcpy(num, n);
  } void Real::Reset_denom(char *d)
  {
    delete[] denom;
    denom = new char[strlen(d)+1];
    if (!denom) NoMemory();
    strcpy(denom, d);
  }

// Assignments operators. --------- const Real &Real::operator=  (const Real &real)
  {
    Reset_re(real.re, real.rlen);
    Reset_denom(real.denom);
    Reset_num(real.num);
    return *this;
  }
```

FIG. 40

REAL. CPP - page 14/33

```cpp
const Real &Real::operator=  (const char *strg)
{
  int L = 0;
  char *p, *s = strdup(strg);   // A recurring no. is provided as
  if (!s) NoMemory();           // XrL, where X is a decimal numeral
  p = strchr(s, (int)'r');      // rL indicates that L digits of X
  if (p) {                      // are recurring digits.
      *p = '\0';
      L = atoi(p+1);
  }
  Reset_re(s, L);
  free(s);
  return *this;
} const Real &Real::operator+= (const Real &real)
{
  char s[3], *t, *ta, *tb;
  int d, i, j, n, n1, n2, p, q, r;
  Real c("c");

if (!strcmp(re, "+.") || !strcmp(re, "-."))
     return *this = real;
  if (!strcmp(real.re, "+.") || !strcmp(real.re, "-."))
     return *this;

if (re[0] == '+' && real.re[0] == '-') {
     real.re[0] = '+';
     *this -= real;
     real.re[0] = '-';
     return *this;
  }
```

FIG. 41

REAL. CPP - page 15/33

```
if (re[0] == '-' && real.re[0] == '+') {
   c = real;
   re[0] = '+';
   c -= *this;
   *this = c;
   return *this;
} n1 = max(dec_at, real.dec_at);
n2 = max(strlen(re + dec_at), strlen(real.re + real.dec_at));
n = n1 + n2 - 1;    // Number of digits in the padded numbers.

// Create temp. buffers ta, tb for re, real.re; zero buffers.

ta = new char[n+2]; // n+2 accounts for sign, digits, '\0'.
tb = new char[n+2];
t  = new char[n+3] + 1; // n+3 accounts for sign, digits,
                        // '\0', and overflow digit.
if (!ta || !tb || !(t-1)) NoMemory();

r = n+1;
while (r--) {
   ta[r] = '0';
   tb[r] = '0';
   t[r]  = '0';
}
```

FIG. 42

_REAL. CPP - page 16/33

```
ta[0]    = re[0];
tb[0]    = real.re[0];
*(t-1)   = '+';
ta[n+1]  = '\0';
tb[n+1]  = '\0';
t[n+1]   = '\0';

// Copy a, b into ta, tb aligning their decimal point
// and removing decimal point.

d = n2-1;
for (i = dec_at-1, j = 0; i; i--, j++) ta[n1-j] = re[i];
for (i = dec_at+1, j = 1; re[i]; i++, j++) ta[n1+j] = re[i];

for (i = real.dec_at-1, j = 0; i; i--, j++)
    tb[n1-j] = real.re[i];
for (i = real.dec_at+1, j = 1; real.re[i]; i++, j++)
    tb[n1+j] = real.re[i];

// Add.

i = n+1;
while (--i) {
    s[1] = '\0';
    s[0] = ta[i];   p = atoi(s);
    s[0] = tb[i];   q = atoi(s);
    s[0] = t[i];    r = atoi(s);
    r = p + q + r;
    Sprintf(s, 3, "%02d", r);
    t[i-1] = s[0];
    t[i]   = s[1];
                                    }
```

FIG. 43

_REAL. CPP - page 17/33

```cpp
        if (ta[0] == '+') *(t-1) = '+';
        if (ta[0] == '-') *(t-1) = '-';

memmove(t,   t+1,   (n-d)*sizeof(char));
        t[n-d] = '.';
        Reset_re(t-1);

delete[] ta;
        delete[] tb;
        delete[] t;
        return *this;
    } const Real &Real::operator-= (const Real &real)
{
    char s[3], *t, *ta, *tb, *w;
    int d, i, j, n, n1, n2, p, q, r, swapped = NO;

if (!strcmp(re, "+.") || !strcmp(re, "-."))
        return *this = -real;
    if (!strcmp(real.re, "+.") || !strcmp(real.re, "-."))
        return *this;
```

FIG. 44

_ REAL. CPP - page 18/33

```
if (re[0] == '+' && real.re[0] == '-') {
   real.re[0] = '+';
   *this += real;
   real.re[0] = '-';
   return *this;
} if (re[0] == '-' && real.re[0] == '+') {
   real.re[0] = '-';
   *this += real;
   real.re[0] = '+';
   return *this;
} n1 = max(dec_at, real.dec_at);
n2 = max(strlen(re + dec_at), strlen(real.re + real.dec_at));
n = n1 + n2 - 1;   // Number of digits in the padded numbers.

// Create temp. buffers ta, tb for re, real.re; zero buffers.

ta = new char[n+2];   // n+2 accounts for sign, digits, '\0'.
tb = new char[n+2];
t  = new char[n+2];
if (!ta || !tb || !(t-1)) NoMemory();

r = n+1;
while (r--) {
   ta[r] = '0';
   tb[r] = '0';
   t[r]  = '0';
}
```

FIG. 45

_REAL. CPP - page 19/33

```
ta[0]    = re[0];
tb[0]    = real.re[0];
t[0]     = '+';
ta[n+1]  = '\0';
tb[n+1]  = '\0';
t[n+1]   = '\0';

// Copy a, b into ta, tb aligning their decimal point
// and removing decimal point.

d = n2-1;
for (i = dec_at-1, j = 0; i; i--, j++) ta[n1-j] = re[i];
for (i = dec_at+1, j = 1; re[i]; i++, j++) ta[n1+j] = re[i];

for (i = real.dec_at-1, j = 0; i; i--, j++)
   tb[n1-j] = real.re[i];
for (i = real.dec_at+1, j = 1; real.re[i]; i++, j++)
   tb[n1+j] = real.re[i];

// Subtract.

i = strcmp(ta+1, tb+1);
if (i < 0) {
   w = ta;
   ta = tb;
   tb = w;
   swapped = YES;
}
```

FIG. 46

_REAL. CPP - page 20/33

```
    i = n+1;
    while (--i) {       // Avoids execution of i = 0.
        s[1] = '\0';
        s[0] = ta[i];   p = atoi(s);
        s[0] = tb[i];   q = atoi(s);
        s[0] = t[i];    r = atoi(s);

if (p >= q) r = p - q;
        else {
            r = 10 + p - q;
            j = i;
            while (--j) {
                s[0] = ta[j];
                p = atoi(s);
                if (p > 0) {
                    p--;
                    Sprintf(s, 3, "%02d", p);
                    ta[j] = s[1];
                    break;
                }
                else ta[j] = '9';
            }
        }
        Sprintf(s, 3, "%02d", r);   // r is single digited.
        t[i]  = s[1];
    } if (ta[0] == '-' && tb[0] == '-') t[0] = '-';
    if (swapped) {
        if (t[0] == '+') t[0] = '-';
        else             t[0] = '+';
    }
```

FIG. 47

_REAL. CPP - page 21/33

```cpp
    memmove(t+1, t+2, (n-d)*sizeof(char));
    t[n-d] = '.';
    Reset_re(t);

delete[] ta;
    delete[] tb;
    delete[] t;
    return *this;
} const Real &Real::operator*= (const Real &real)
{
    char s[2], *p, *d;
    int i, j, k, m, n;
    Real t("t"), u("u"), v[10];

if (!strcmp(re, "+.") || !strcmp(re, "-.") ||
        !strcmp(real.re, "+.") || !strcmp(real.re, "-.")) {
        Reset_re("+.");
        return *this;
    }
```

FIG. 48

_ REAL. CPP - page 22/33

```
// Create the array v[i] = i*(*this) on abs(*this).

i = 10;
while (i--) v[i].Rename(FormStrg("v[%d]", i));
v[0].Reset_re("0");

for (i = 1; i < 10; i++) v[i] = v[i-1] + *this;
p = new char[n = strlen(re) + strlen(real.re)];
if (!p) NoMemory();

// Multiply   re and real.re are both non-zero.

s[1] = '\0';
i = strlen(real.re);
k = 0;

while (TRUE) {
   i--;
   if (real.re[i] == '+' || real.re[i] == '-') break;
   if (real.re[i] == '.') continue;

s[0] = real.re[i];
   j = atoi(s);

// Initialize p p[0] = '+';
   p[n-1] = '\0';
   m = n-1;
   while (--m) p[m] = '0';
```

FIG. 49

_REAL. CPP - page 23/33

```
        if (j) {
           m = 1;    // Copy v[j].re to p, keep trailing zeros of p.
           while (v[j].re[m]) p[m++] = v[j].re[m];
           m = k;             // Move right the decimal point.
           d = strchr(p, (int)'.');
           while (m--) *d++ = *(d+1);
           *d = '.';
           u.Reset_re(p);
           t += u;
        }
        k++;
    }

// Adjust the decimal point of the final result.

m = strlen(strchr(real.re, (int)'.')+1);
if (m == 0) strcpy(p, t.re);
else {
      p[0] = '+';
      j = n-2;
      i = strlen(t.re);
      while (i) p[j--] = t.re[i--];
      while (j) p[j--] = '0';

j = 1; while (*(p+j) != '.') j++;
      while (m--) p[j--] = p[j-1];
      p[j] = '.';
}
```

FIG. 50

_REAL. CPP - page 24/33

```
    if (re[0] != real.re[0]) p[0] = '-';   // Set sign of result.
    Reset_re(p);
    delete[] p;
    return *this;
} const Real &Real::operator/= (const Real &real)
{
    char *d, *r, s[2];
    int Ea, Eb, i, j, k, m, n, N;
    Real b("b", real), t("t"), v[10], z("z"), *S;

if ((!strcmp(re, "+.") || !strcmp(re, "-.")) &&
        (!strcmp(real.re, "+.") || !strcmp(real.re, "-.")))
        _Fatal("Real::operator/=", "0/0 encountered");

if (!strcmp(real.re, "+.") || !strcmp(real.re, "-."))
        _Fatal("Real::operator/=", "Division by 0.0.");

if (!strcmp(re, "+.") || !strcmp(re, "-.")) return *this;
```

FIG. 51

REAL. CPP - page 25/33

```cpp
// ---------------- k = b.dec_at;                    // Set up b.re for multiplication.
n = strlen(b.re) - 1;            // b.re[n+1] = '\0'.
if (k != 1) {
   memmove(b.re+k, b.re+k+1, (n-k)*sizeof(char));
   b.re[n] = '.';
   Eb = k-n;
}
else {
   i = 2;
   while (b.re[i] == '0') i++;
   memmove(b.re+1, b.re+i, (n-i+1)*sizeof(char));
   b.re[n-i+2] = '.';
   b.re[n-i+3] = '\0';
   Eb = 2 - (n+1);
} b.re[0] = '+';                   // Deal with a positive b only.
b.dec_at = (int)(strchr(b.re, (int)'.') - b.re);
b.size = strlen(b.re) + 1;

k = dec_at;                      // Set up re for multiplication.
n = strlen(re) - 1;
if (k != 1) {
   memmove(re+k, re+k+1, (n-k)*sizeof(char));
   re[n] = '.';
   Ea = k-n;
}
```

FIG. 52

_REAL. CPP - page 26/33

```cpp
else {
   i = 2;
   while (re[i] == '0') i++;
   memmove(re+1, re+i, (n-i+1)*sizeof(char));
   re[n-i+2] = '.';
   re[n-i+3] = '\0';
   Ea = 2 - (n+1);
}
dec_at = (int)(strchr(re, (int)'.') - re);
size = strlen(re) + 1;
rlen = 0;

k = dec_at - b.dec_at;   // Move dec pt in re to re[b.dec_at].
if (k > 0) {
   memmove(re+b.dec_at+1, re+b.dec_at, k*sizeof(char));
   re[b.dec_at] = '.';
   dec_at = (int)(strchr(re, (int)'.') - re);

Ea += k;
}

// Copy this into t, reset t.re to longer strg size. Create r.

delete[] t.re;
j = strlen(re);
N = max(2*(int)(j + strlen(real.re)), 11);
r    = new char[N+3];
t.re = new char[m = N+j+2];          // define m.
S    = new Real[N+1];
if (!r || !t.re || !S) NoMemory();
```

FIG. 53

_ REAL. CPP - page 27/33

```
// Set up r[]. r[0] has the sign of the final result.

r[1] = '.';
r[0] = '+';
if (re[0] != real.re[0]) r[0] = '-';
for (i = 2; i < N+2; i++) r[i] = '0';   // Puts N zeros in r.
r[N+2] = '\0';

// Set up t.

t.re[0] = '+';          // Deal with a positive t.re only.
for (i = 1; *(re+i); i++)
    t.re[i] = re[i];    // Copy re into t.re.
while (i < m-2) t.re[i++] = '0'; // Pad with trailing zeros.
t.re[m-2] = '1';   // Prevent trailing 0s from formating out!
t.re[m-1] = '\0';
t.dec_at = b.dec_at = (int)(strchr(b.re, (int)'.') - b.re);
t.size = strlen(t.re)+1;

// Set up arrays v[] and S[].

i = 10;
while (i--) v[i].Rename(FormStrg("v[%d]", i));
v[0].Reset_re("0");
for (i = 1; i < 10; i++) v[i] = v[i-1] + b;
i = N+1;
while (i--) S[i] = z;
```

FIG. 54

_REAL. CPP - page 28/33

```
// Division k = 2;           // r[0] = '+' or '-' and r[1] = '.'
while (TRUE) {
   i = 10;       // Set v[].
   while (--i) {
      if (v[i] > t) continue;
      else break;
   } if (i) t -= v[i];
   Sprintf(s, 2, "%d", i);
   *(r+k) = s[0];
   if (*(r+k+2) == '\0') break;

d = strchr(t.re, (int)'.');
   *d = *(d+1);
   *(d+1) = '.';
   t.dec_at = (int)(strchr(t.re, (int)'.') - t.re);
   t.size = strlen(t.re)+1;

// Check if t is zero.

j = strlen(t.re);
   t.re[j-1] = '0';
   z.Reset_re(t.re);
   t.re[j-1] = '1';
   if (IsZero(z)) break;
```

FIG. 55

_REAL. CPP - page 29/33

```
        // Check if repeating digits are found.

j = k-2;
        S[j] = z;
        while(j--) {
            if (S[k-2] == S[j]) {   // Executes only if k > 2.
                rlen = k - 2 - j;
                break;
            }
        }
        if (rlen > 0) break;
        k++;
    } k = Ea - Eb;
    if (k >= 0) {
        memmove(r+1, r+2, k+1);
        r[k+2] = '.';
    }
    else {
        k++;    // -ve k. Accounts for preexisting dec pt at r[1].
        memmove(r+2-k, r+2, strlen(r+2)+k);
        while (k++) r[2-k] = '0';
    }
    Reset_re(r, rlen);      // Copy r into re.
    delete[] r;
    delete[] S;
    return *this;
}
```

FIG. 56

_REAL. CPP - page 30/33

```
// Other operators.   -------------- int Real::operator== (const Real &real) const
{
  if (strcmp(re, real.re)) return FALSE;
  return TRUE;
} int Real::operator!= (const Real &real) const
{
  return !(*this == real);
} int Real::operator>  (const Real &real) const
{
  int i = CmpReal(re, real.re);
  if (i == 1) return TRUE;
  return FALSE;
} int Real::operator>= (const Real &real) const
{
  int i = CmpReal(re, real.re);
  if (i == 1 || i == 0) return TRUE;
  return FALSE;
}
```

FIG. 57

_REAL. CPP - page 31/33

```
int Real::operator<  (const Real &real) const
{
  int i = CmpReal(re, real.re);
  if (i == -1) return TRUE;
  return FALSE;
} int Real::operator<= (const Real &real) const
{
  int i = CmpReal(re, real.re);
  if (i == -1 || i == 0) return TRUE;
  return FALSE;
}

Real operator+ (const Real &a, const Real &b)
{
  Real T = a;
  T += b;
  return T;
}

Real operator+ (const Real &a)
{
  return a;
}

Real operator- (const Real &a, const Real &b)
{
  Real T = a;
  T -= b;
  return T;
}
```

FIG. 58

_REAL. CPP - page 32/33

```
Real operator- (const Real &a)
{
  Real T = a;
  if (T.re[0] == '+') T.re[0] = '-';
  else T.re[0] = '+';
  return T;
}

Real operator* (const Real &a, const Real &b)
{
  Real T = a;
  T *= b;
  return T;
}

Real operator/ (const Real &a, const Real &b)
{
  Real T = a;
  T /= b;
  return T;
}
```

FIG. 59

_REAL. CPP - page 33/33

```
// Other functions.

Real GCD(const Real &a, const Real &b)
{
   // Euclid's algorithm for calculating GCD.
   // Algorithm is more than 2000 years old.

Real u("u", a), v("v", b), t("t");

u.re[0] = '+';
   v.re[0] = '+';
   while (strcmp(u.re, "+.")) {    // If u.re > 0.
      if (u < v) { t = u;  u = v;  v = t; }
      u = u - v;
   }
   return v;
}

Real ExecFormRatio(Real &a)
{
   return a.FormRatio(a);
} int IsZero(const Real &a)
{
   if (!strcmp(a.re, "+.") || !strcmp(a.re, "-.")) return TRUE;
   return FALSE;
}
```

FIG. 60

ARITHMETIC AND RELATIONAL OPERATIONS

FIELD OF THE INVENTION

The present invention relates to performing arithmetic and relational operations.

BACKGROUND

In modern digital computers, the conversion of decimal numerals to a binary representation is not always exact. By performing arithmetic operations using longer binary string mappings of decimal numerals, this imprecision can be reduced, but not eliminated.

The imprecision of binary representations creates problems when two decimal numerals are compared, and an exact comparison is desired. Correct results from such comparisons cannot be guaranteed. Incorrect results are quite possible if the compared numerals are very close in value to each other. In digital computing hardware, decimal numerals are represented by a finite number of binary bits referred to as floating point numbers.

The set F of floating point numbers that can be represented on a digital computer is not a continuum, or even an infinite set. In fact, the total number of floating point numbers in F that can be represented on a digital computer can be calculated if machine details are available. Unfortunately, these numbers are not even equally spaced in F. Thus, there is no possibility of representing the continuum of real numbers in any detail. Indeed, each number in F has to represent a whole interval of real numbers. Moreover, real numbers in absolute value larger than the maximum number of F cannot be said to be represented at all. And, for many purposes, the same is true of non-zero real numbers smaller in magnitude than the smallest positive number in F.

Forsythe et al (Forsythe, G E, Malcolm, M A, and Moler, C B, Computer Methods for Mathematical Computations, Prentice-Hall, Inc., New Jersey, 1977) state at page 10: "The badly named real number system underlies the calculus and higher analysis to such an extent that we may forget how impossible it is to represent all real numbers in the real world of finite computers. However, as much as the real number system simplifies analysis, practical computing must do without it". As a simple example, Forsythe et al indicate at page 12 that the floating-point number 0.1 summed 10 times does not result in 1 in a floating-point number system for which the number base is a power of 2, because $\frac{1}{10}$ does not have a terminating expansion in powers of $\frac{1}{2}$.

Forsythe et al further state at page 13 that: "The operations of floating-point addition and multiplication are commutative but not associative, and the distributive law also fails for them. Since these algebraic laws are fundamental to mathematical analysis, analyses of floating-point computations are difficult".

Higher precision can be provided by using larger number of binary bits, typically some integer multiple (2 or 4) of the number of bits used for a single precision floating point number. In such cases, usually each precision level is treated as a separate data type and rules of interaction with other precision levels are coded into the compiler. For example, many compilers have provisions for single and double precision levels of floating point numbers, and also rules for the handling of mixed operations between single and double precision floating point numbers.

In view of the above observations, a need clearly exists for an improved manner of dealing with decimal numerals in arithmetic and relational operations in digital computers.

SUMMARY

A computer implementable technique is described for carrying out arithmetical and relational operations involving numerals of arbitrary size. Examples are described using decimal numerals, for convenience. An advantage of the described technique is that results of arithmetical calculations are either exact, or flagged to indicate that the result is a non-terminating repeating numeral. Furthermore, all relational operations are computed exactly.

The described techniques permit exact arithmetic calculations on decimal numerals, provided the result is a terminating numeral. If the result is a repeating numeral, the result is flagged to indicate that this is the case. To maintain computational accuracy, the decimal numerals are converted to rational fractions, whenever necessary, and computations are performed using such fractions. Consequently, the results of relational operations are exact. The described techniques are applicable to irrational numbers provided such numbers are approximated (to desired accuracy) by rational numbers, and those rational numbers are used instead of the irrational numbers in the computations. This is the only practical thing to do, since irrational numbers are non-terminating. Computations involving irrational numbers are generally not exact.

The described techniques treat the sign, the decimal point, and the digits comprising the decimal numeral as individual character symbols. All arithmetical and relational operations are performed on character strings, rather than on binary maps of decimal numerals. Accuracy is guaranteed if computations involve only rational numbers.

The described techniques are implemented as a class named Real (to indicate that the class represents real numbers) in the C++ programming language. This class represents a number in both decimal numeral and rational fraction forms and contains all the functions necessary to implement arithmetical and relational operations on such numbers. A string representing a decimal numeral is converted into a Real and vice-versa. Accordingly, mixed operations between a string and a Real are permissible. All character strings in C++ end with an end-of-string character. The length of the string returned by the strlen( ) function in C++ gives the number of characters in the string, but excludes the end-of-string character. The size of a string is the memory allocated to the string inclusive of the end-of-string character. The memmove( ) function in C++ copies a block of bytes in computer memory from one location in memory to another location. For convenience, the memmove( ) function is used whenever blocks of characters are required to be shifted or moved in memory.

As may be expected, the described techniques, when implemented, are expensive in computation time compared to existing implementations of floating-point arithmetic on commercially available compilers. However, this relative expense is worthwhile in cases for which computational accuracy is of primary or critical concern, such as certain scientific calculations of planetary orbits, massive financial transactions, etc.

DESCRIPTION OF DRAWINGS

FIG. 23 represents illustrative C++ code for calculating the greatest common divisor (GCD) using Euclid's algorithm.

FIG. 24 represents illustrative C++ code for comparing two numbers of class Real.

FIGS. 25 to 27 jointly represent the header file (_REAL.H) of class Real.

FIGS. 28 to 60 jointly represent the class module source code in C++ for class Real (_REAL.CPP).

DETAILED DESCRIPTION

Figure 1:
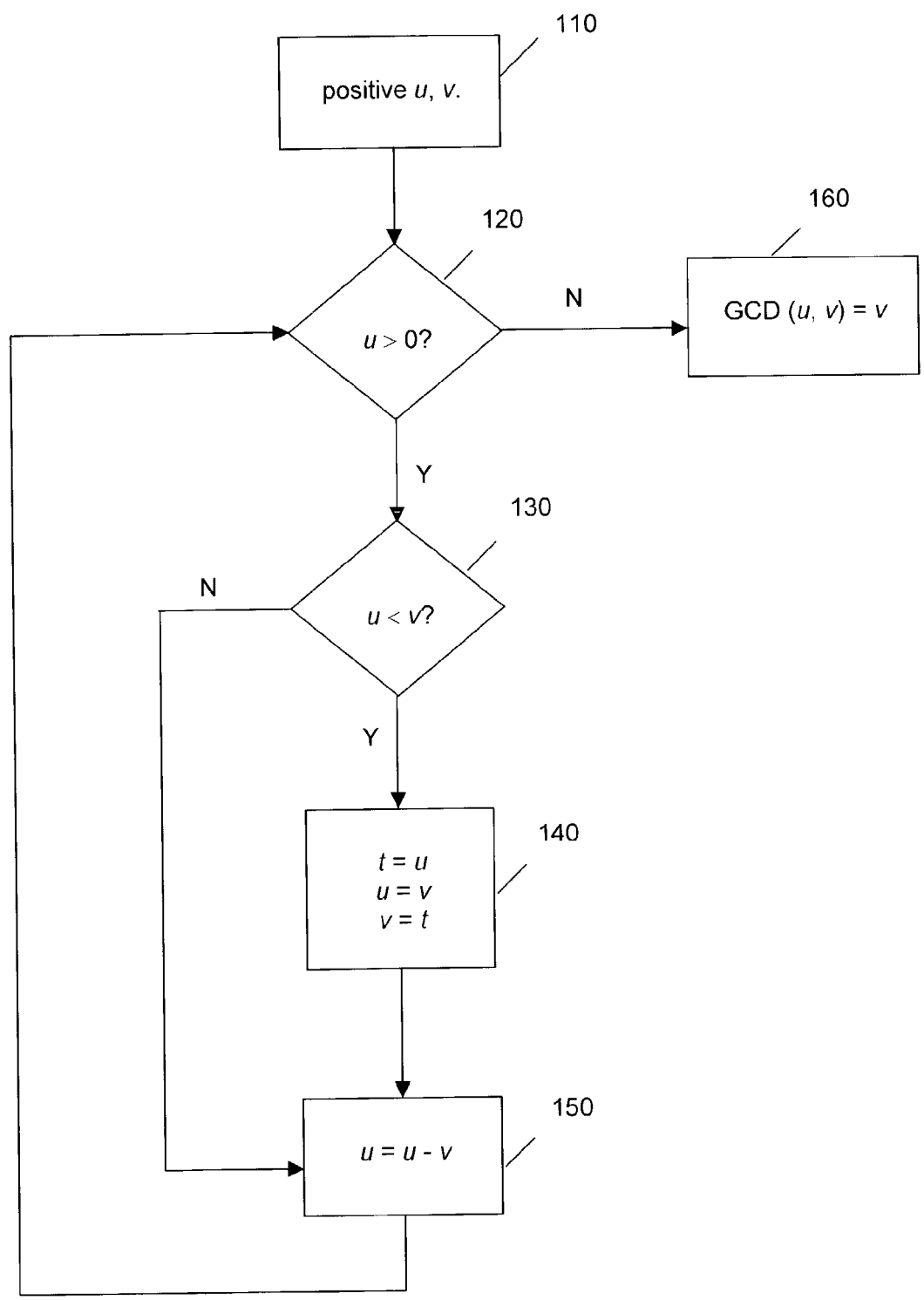
FIG. 1 is a flowchart of an algorithm for calculating the greatest common divisor of two integers.

A method, computer software program and system for arithmetic and relational operations involving decimal numerals are described herein for decimal numerals of arbitrary size.

Terminiology

A few explanatory definitions for the listed terms are given below.

Canonical Representation of a Decimal Numeral

In a canonical representation, a decimal numeral always has a sign (either '+' or '−'), a decimal point, and only significant digits. Thus, the numeral does not have any leading zeros to the left of the decimal point, and no trailing zeros to the right of the decimal point. For example, the canonical form of "0.00" is "+.", and "021.452100", in its canonical form, is "+21.4521".

Further, each numeral has associated with it an index which stores the length of the repeating block of digits, if any, in the numeral. If the numeral is terminating, the index value is zero. All repeating numerals contain only one instance of the repeating block of digits and no more. Thus "+0.3333 . . . " appears as "+0.3" with its index value as 1, and "4.213125125 . . . " appears as "+4.213125" with its index value as 3 since the repeating block "125" is of length 3. Definitions of terminating and repeating numerals are provided below.

Padded Form of a Decimal Numeral

For terminating numerals, the left part of the numeral to the decimal point is padded with a user specified number, for example, m leading zeros, and the right part of the numeral to the decimal point is padded with a user specified number, for example, n trailing zeros. For example, "+." when padded with m=1, n=2 appears as "+0.00", and "−21.4521" when padded with m=2, n=4 appears as "−0021.45210000". Padding is used when necessary to place the decimal point at a particular location in the string representing a given decimal numeral.

For repeating numerals, padding to the left of the decimal point is as noted above, but padding to the right of the decimal point is done by repeatedly appending the repeating block of digits until the padding is complete. In the process, the last appended block may get truncated once the padding is completed.

Terminating Numerals

These are numerals that have a finite number of digits to the right of the decimal point when completely represented. For example, ⅜ when expressed as a decimal numeral is the terminating numeral +0.375 and ⁶⁄₅ when expressed as a decimal numeral is the terminating numeral +1.2.

Repeating Numerals

Repeating numerals are numerals that have an infinite number of significant digits to the right of the decimal point and the property that, excepting possibly a certain number of digits immediately to the right of the decimal point, the remaining digits to the right comprise a block of digits that repeats itself indefinitely.

For example, ⅚ when expressed as a decimal numeral is the repeating numeral +0.83333 . . . which, except for the first digit (that is, 8) to the right of the decimal point, has a block of 1 digit (that is, "3") repeated indefinitely. Another example is ³⁷⁴⁄₃₃₃ which when expressed as a decimal numeral is the repeating numeral +1.123123123 . . . , which has a block of three digits (that is, "123"), beginning immediately after the decimal point, repeated indefinitely.

A rational number has a decimal numeral representation that is either a terminating numeral or a repeating numeral. The converse is also true. That is, a decimal numeral represents a rational number if and only if the numeral is either terminating or repeating. If a number is not rational then it is irrational and necessarily non-terminating.

Greatest Common Divisor

The techniques described below require calculation of a greatest common divisor (GCD) g of two positive integers u and v. The greatest common divisor is the numerically largest common divisor of the two integers u, v. A simple algorithm for finding the GCD of two integers is provided in Euclid's 7th book, as proposition 2.

FIG. 1 is a flowchart of an algorithm for calculating the GCD of two positive integers, u and v. In step 110, the two input integers u and v are provided. In step 120, a determination is made whether u is greater than zero. If u is not greater than zero, the GCD of u and v is determined as v, in step 160. If u is greater than zero, a comparison is made of u and v in step 130.

If u is less than v, then a number of assignments are made in step 140: a temporary variable t is equated to u, u is equated to v and v is equated to t. That is, the contents of u and v are swapped. After step 140, or if u is not less than v, u is equated to u less v in step 150. At this point, the algorithm reverts to step 120, and repeats steps 120 to 150 until this loop branches to step 160 described above.

A modified version of GCD is implemented for variables u and v that are of class Real and the operators used are those applicable to Real variables.

A header file (_REAL.H) and a code module that illustrates class Real (_REAL.CPP) are presented in FIGS. 25 to 27, and 28 to 60 respectively.

Converting a Decimal Numeral to a Rational Fraction

Let a be a real number expressed in the canonical form. There are two cases to be considered: that of (i) a terminating numeral or (ii) a repeating numeral. The arithmetic operators used in the steps below are those operators explained below. The rational fraction of a is represented as p/q.

Terminating Numeral Case

Figure 2:
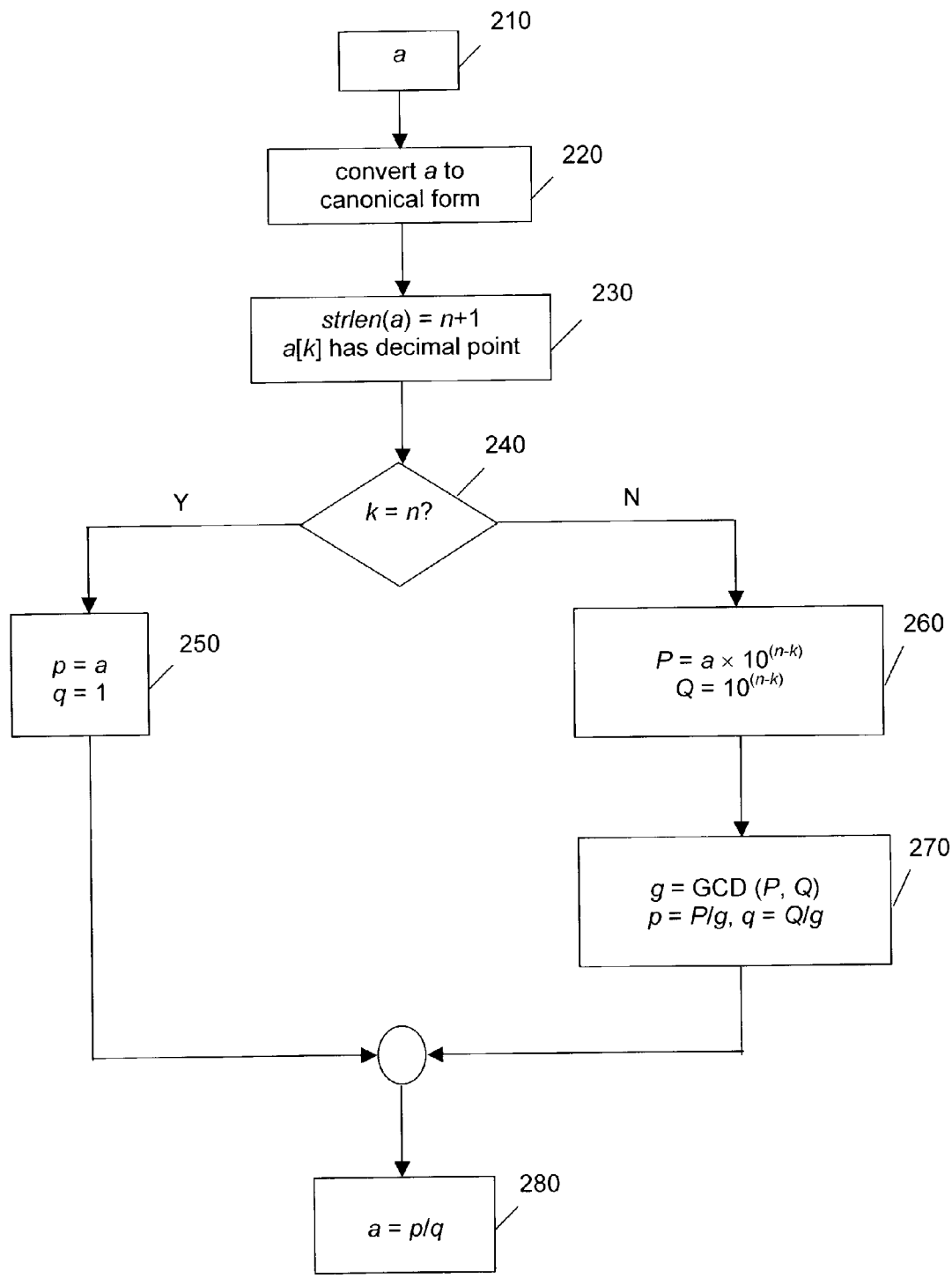
FIG. 2 is a flowchart of an algorithm for converting a decimal number to a fraction for a terminating decimal number.

FIG. 2 represents the process of converting a decimal numeral to a rational fraction for a terminating numeral.

A terminating number a is provided in step 210, and is converted to a string wherein a is represented in its canonical form in step 220. In step 230, let n+1 be the value returned by strlen(a), and let element a[k] of a contain the decimal point.

(a) If k=n in step 240, then the numerator p of the rational fraction of a is the number itself, the denominator q is 1 in step 250.

(b) If k≠n in step 240, then step 260 is performed. The numerator P of the rational fraction is the number obtained by shifting n−k digits of a beginning with a[k+1] by one character to the left and placing the decimal point at a[n], that is, multiplying a by $10^{(n-k)}$. The denominator Q is the integer $10^{(n-k)}$.

(c) In step 270, the greatest common divisor g of the numerator P and the denominator Q is determined, treating both, in effect, as positive numbers. Therefore, g will be positive. Also, p=P/g and q=Q/g are consequently obtained.

(d) In step 280, the final rational fraction of a is p/q from the values of p and q obtained in step 250 or 270. The value of p has the sign of a and q has a positive sign.

Repealing Numeral Case

Figure 3:
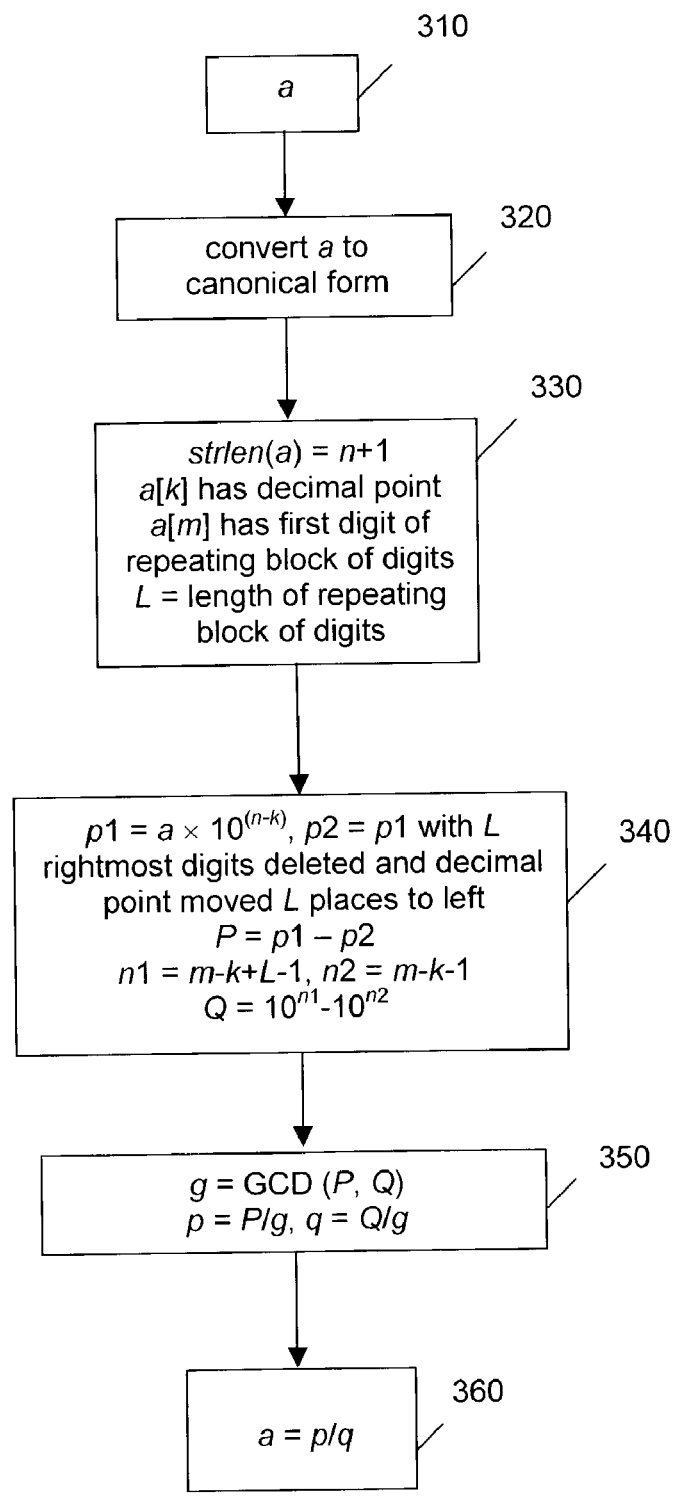
FIG. 3 is a flowchart of an algorithm for converting a decimal number to a fraction for a repeating decimal number.

FIG. 3 represents the process of converting a decimal numeral to a rational fraction for a repeating numeral.

Recall that in canonical form, a has only one instance of the repeating block of digits. In this case, obviously, the decimal point is not the last character in the string representing a.

With reference to FIG. 3, the value of a is provided in step 310, and is converted to a string wherein a is represented in its canonical form in step 320.

In step 330, let L be the length of the repeating block of digits, and n+1 be the value returned by strlen(a). Further, let the element a[k] of a contain the decimal point and the element a[m] contain the first digit of the repeating block of digits.

(a) In step 340, the numerator P of the rational fraction is the integer p1−p2, where p1 is the number obtained by shifting n−k digits of a beginning with a[k+1] by one character to the left and placing the decimal point at a[n], that is, multiplying a by $10^{(n-k)}$, and p2 is the number obtained by deleting the rightmost L digits from p1 and moving the decimal point L places to the left. The denominator Q is the integer $10^{n1}-10^{n2}$, where n1=m−k+L−1, and n2=m−k−1.

(b) In step 350, the greatest common divisor g of the numerator P and the denominator Q are determined, treating both, in effect, as positive numbers. Values for p=P/g, and q=Q/g are obtained.

(c) The final rational fraction of a is determined as p/q in step 360, where p has the sign of a and q has a positive sign.

Implementation of Arithmetic and Relational Operators

Consider:

two unary arithmetic operators: '+' (addition) and '−' (subtraction), each involving a single argument, and four binary arithmetic operators '+' (addition), '−' (subtraction), '*' (multiplication), and '/' (division), each involving two arguments, and six relational operators '>' (greater than), '≧' (greater than or equal to), '<' (less than), '≦' (less than or equal to), '=' (equal to), and '≠' (not equal to).

A number may have a decimal numeral representation or a rational fraction representation. The specific representation, if unstated, is usually clear from the context. A decimal numeral can be converted into a rational fraction and vice-versa. A real variable is a variable that can take decimal numerals or their equivalent rational fractions as values.

The phrase, "moving the decimal point by k places . . . " involves moving the decimal point in a decimal numeral to a location that reflects the multiplication of the number by the factor $10^k$. Here k is positive when movement is to the right, and negative when movement is to the left.

Unary Addition Operator (+)

Consider a number a, formatted in the canonical form described above. Return a as the result.

Unary subtraction operator (−)

Consider a number a, formatted in the canonical form described above. Create a real variable t. Copy a into t. Change the sign of t. Return t as the result.

Binary Addition Operator (+)

Figure 4:
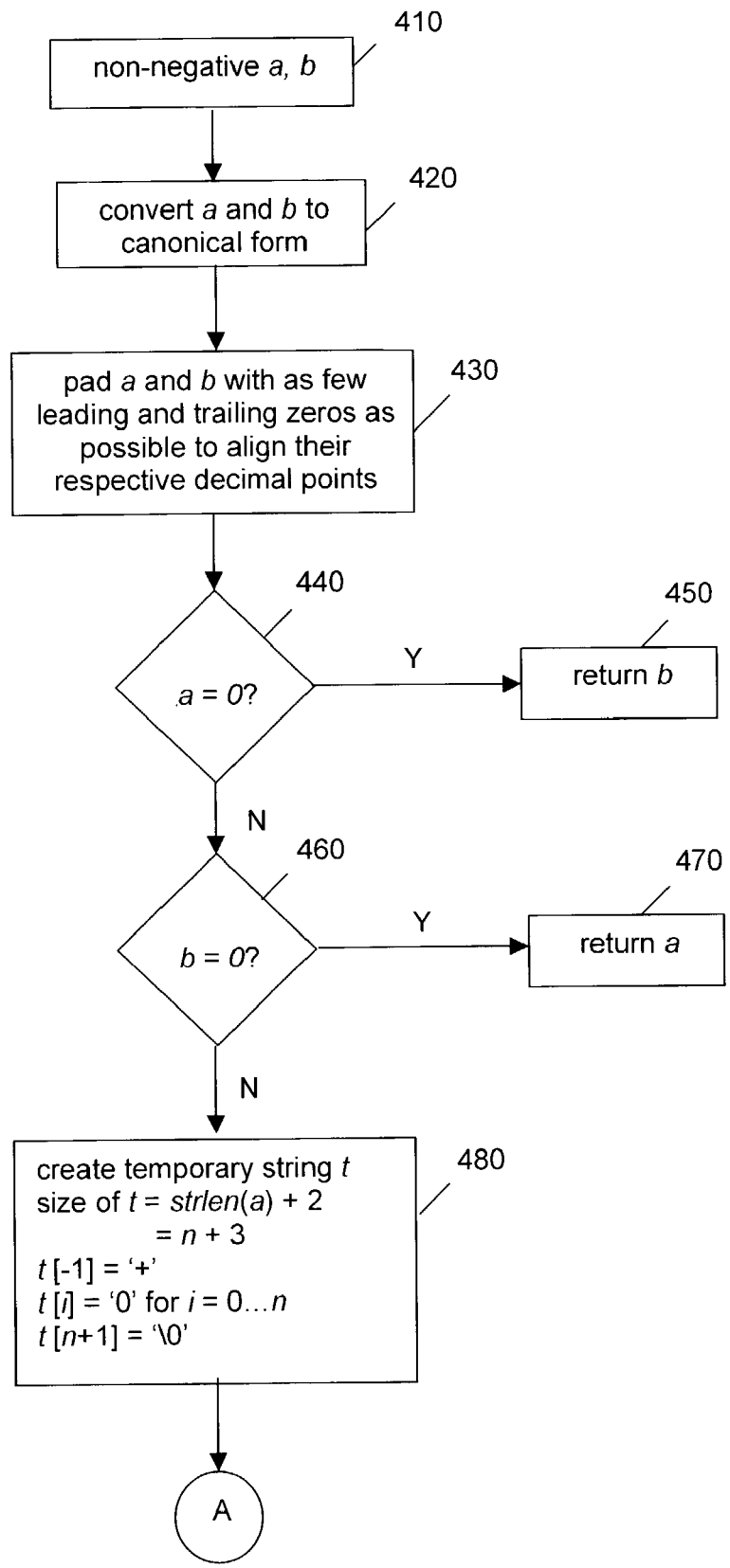
FIGS. 4 and 5 jointly form a flowchart of an algorithm for a binary addition operation for two terminating decimal numbers.
Figure 5:
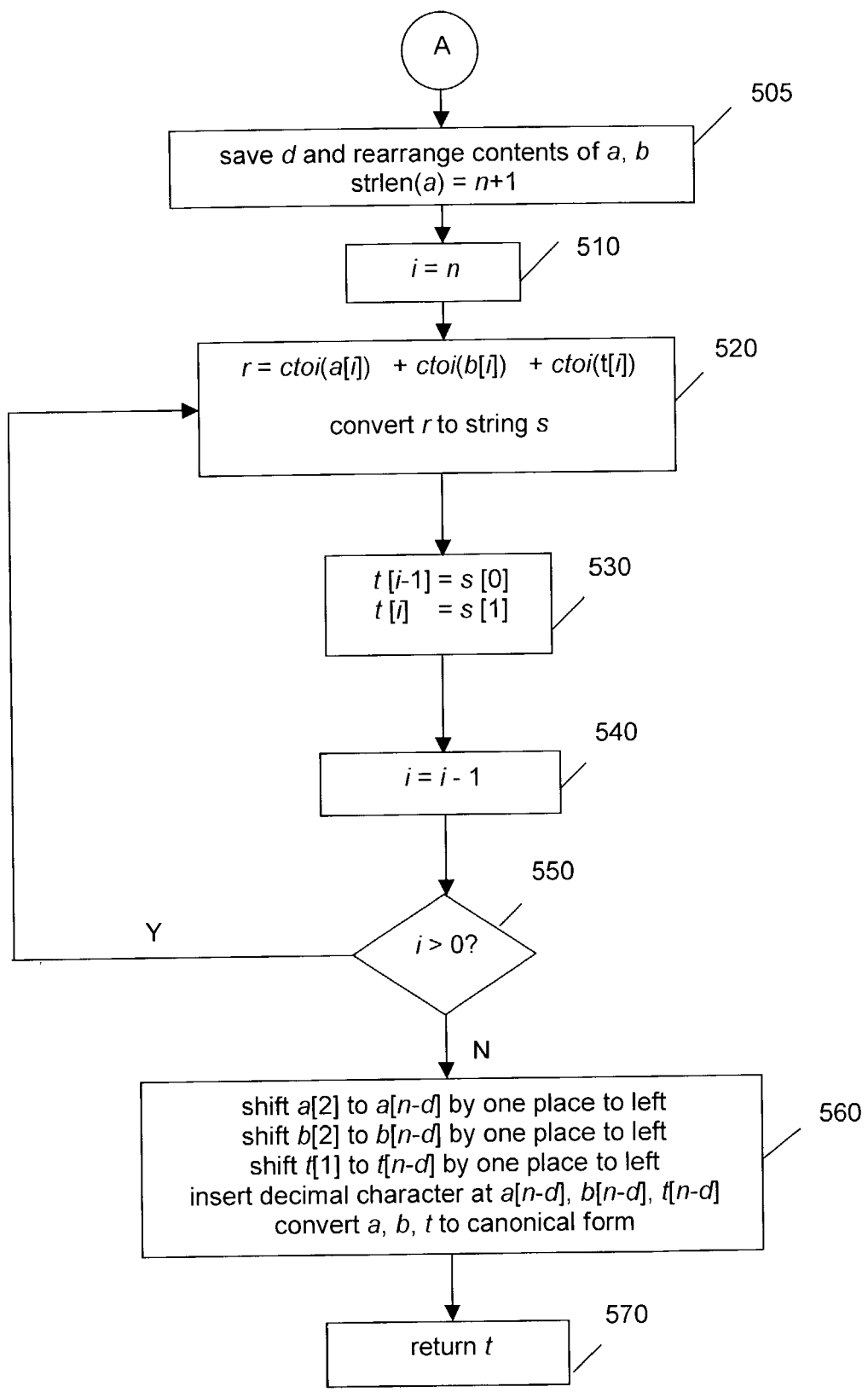
Figure 6:
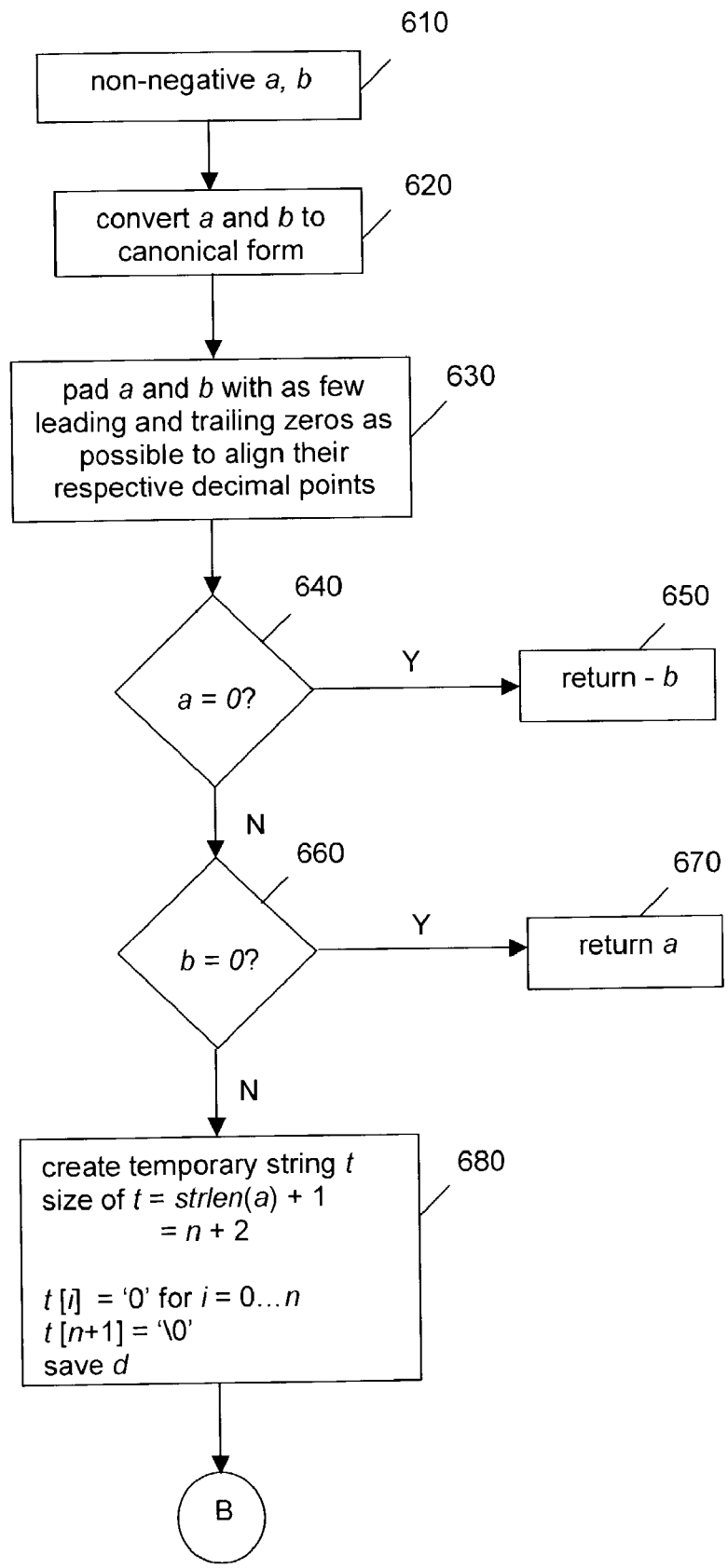
FIGS. 6 to 9 jointly form a flowchart of an algorithm for a binary subtraction operation for two terminating decimal numbers.
Figure 7:
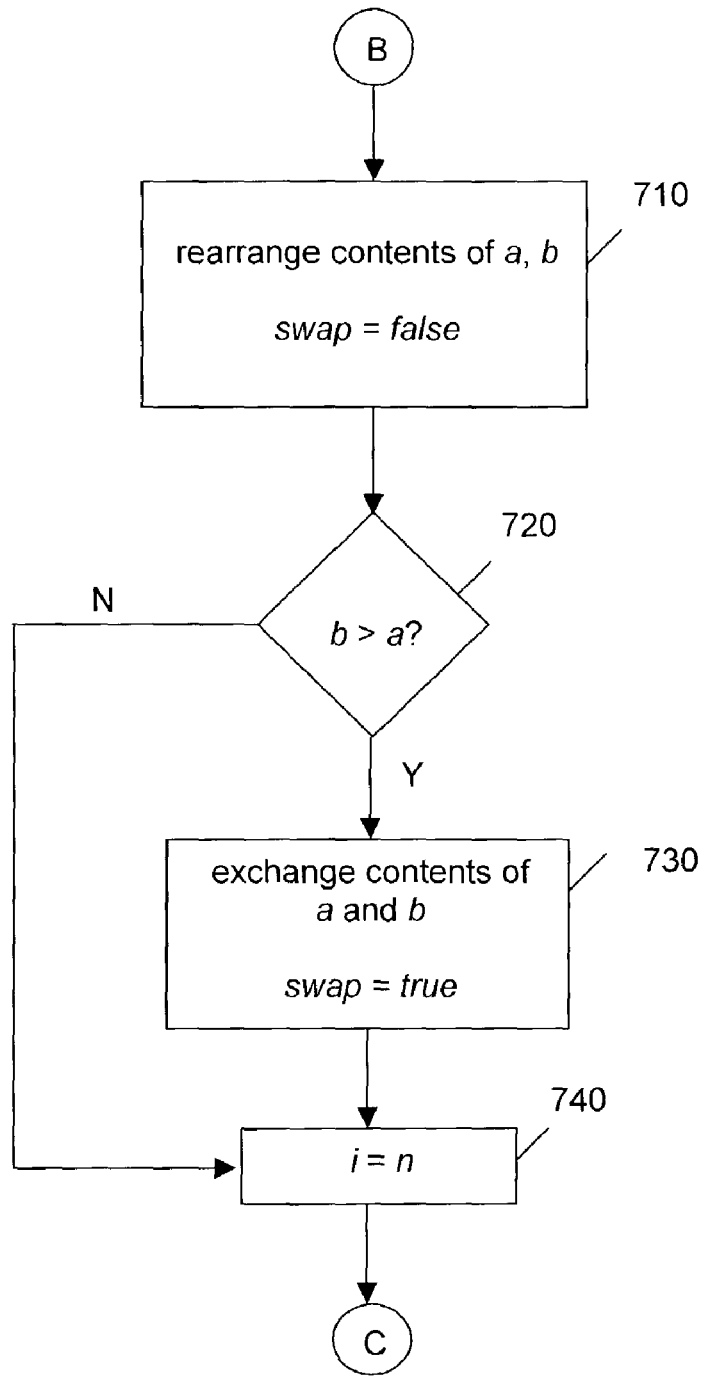
Figure 8:
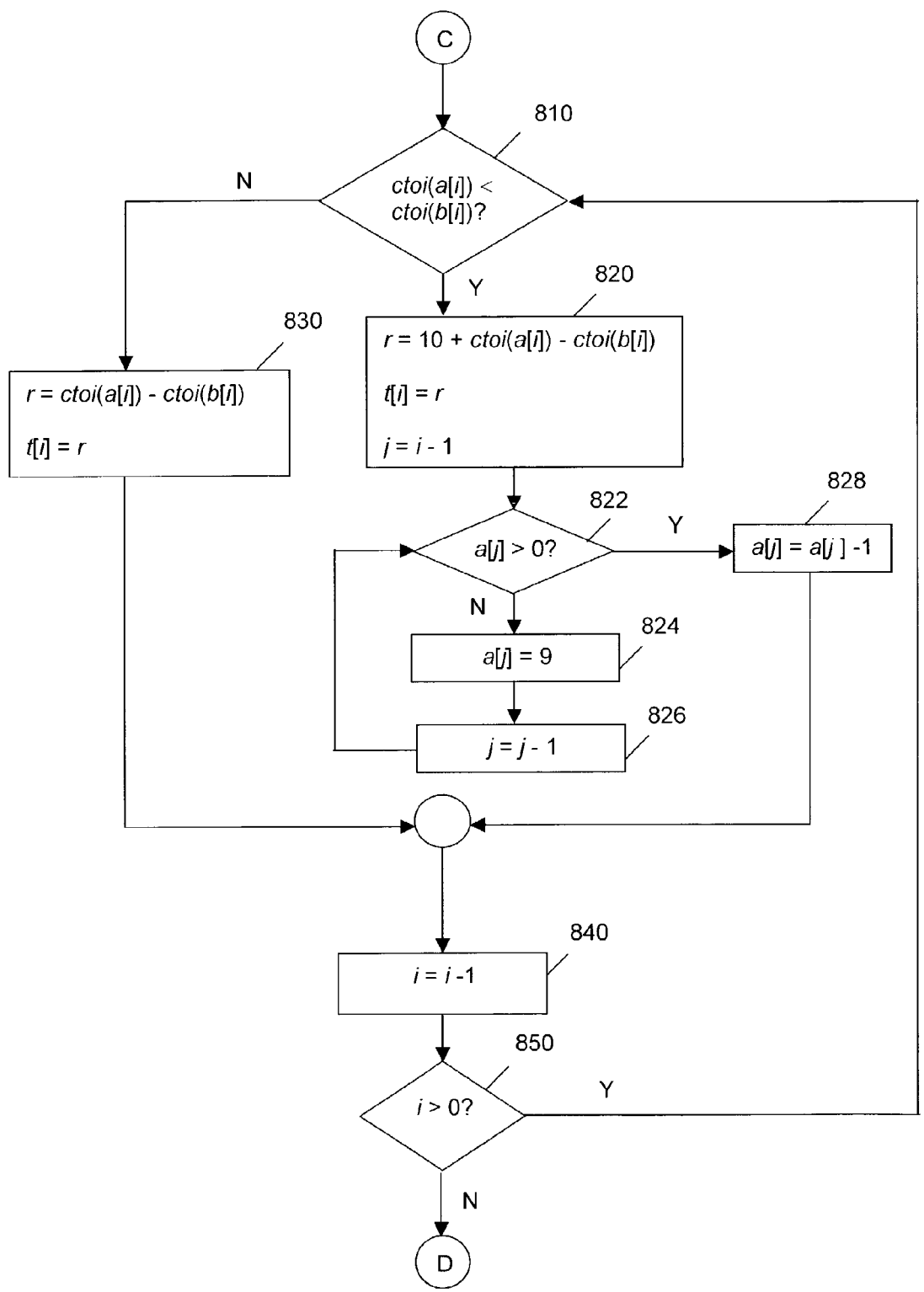
Figure 9:
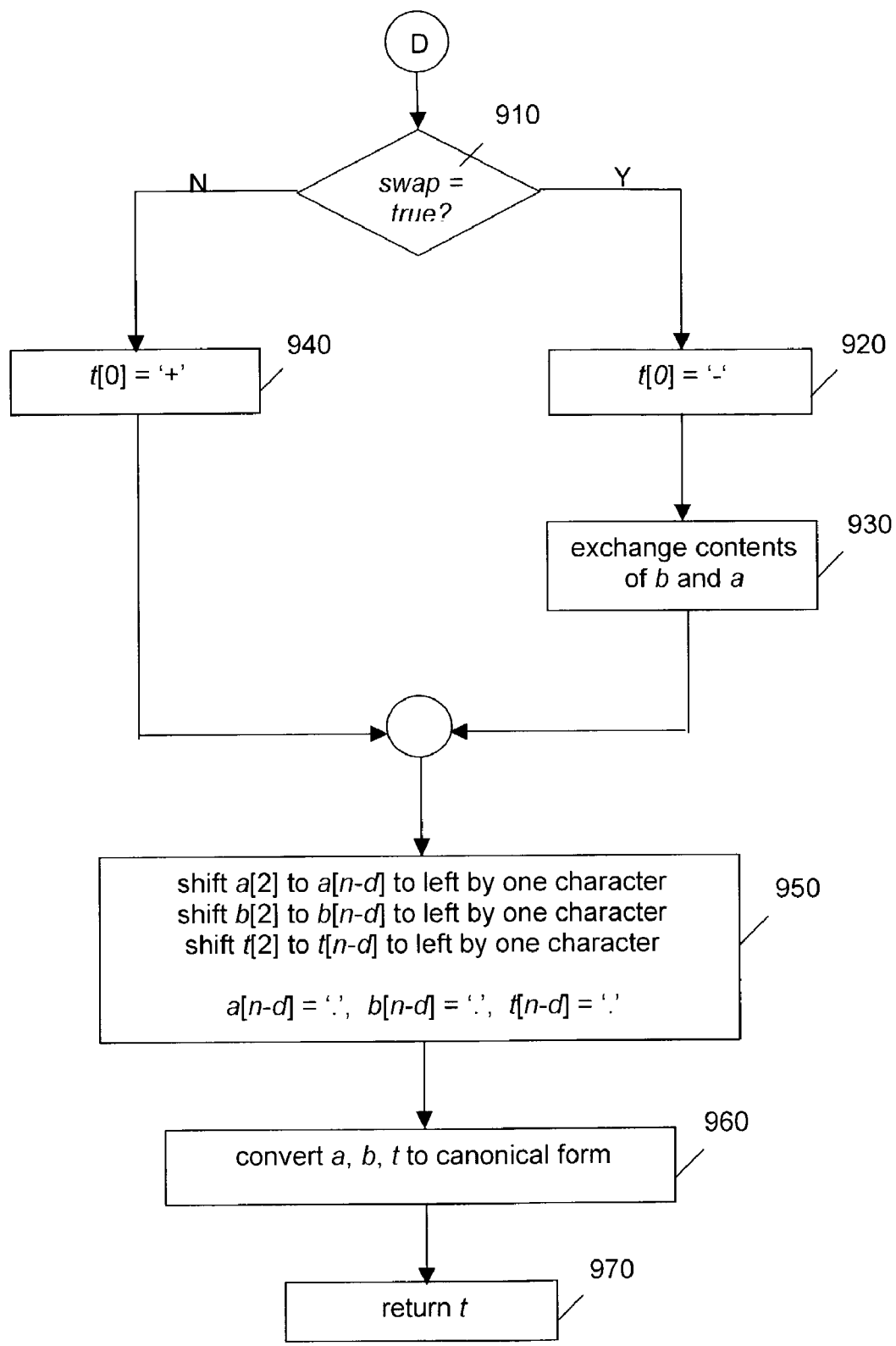

FIGS. 4 and 5 represent an algorithm for performing binary addition. Two non-negative numbers a and b are considered in step 410, and formatted in the canonical form described above in step 420. The numbers a and b are padded in step 430 with as few leading and trailing zeros as possible so that their respective decimal points appear at the same relative position with respect to the beginning of their respective character strings and the two string sizes become the same.

Thus, given a=+4.2128 and b=+121.14, their respective padded forms will be +004.2128 and +121.1400. On these padded forms the following steps are performed:

1. If a=0 in step 440, return b as the result in step 450. If b=0 in step 460, return a as the result in step 470. If neither a=0 nor b=0, step 480 is performed.

2. In step 480, create a temporary character string t of size=strlen(a)+2 such that t begins at t[−1] and ends at t[n+1]. Fill t with zero characters except for the first character, i.e. t[−1], which is filled with '+' and the rightmost character, namely t[n+1], which is filled with the end-of-string character, '\0'.

3. In step 505, separately, save the relative location d of the decimal point with respect to the last digital character after the decimal point in the string of either a (or equivalently, of b). In the example, d=4 indicating that there are 4 digital characters to the right of the decimal point. If there are no digital characters to the right of the decimal point then d=0.

4. Then shift the block of digital characters between the decimal point and the sign of a by one character to the right. This overwrites the decimal point. Put a zero character in the vacated place immediately after the sign character of a. Do likewise for b.

5. If the numbers representing a, b, and t are placed one below the other, these numbers appear as follows:

| | |
|---|---|
| +00042128 | → a |
| +01211400 | → b |
| +000000000 | → t |

Now, let n+1 be the number of characters in a sequentially identifiable as a[0], a[1], . . . a[n], where a[0] contains the sign of a, and a[1] to a[n] contain its digits. Likewise b[0] contains the sign of b, and b[1] to b[n] contain its digits. Finally, t[−1] contains the sign '+', t[0] to t[n] contain only zeros. Each of a[n+1], b[n+]1, t[n+1] contains the end-of-string character.

6. In step 510, put i=n.
7. In step 520, compute the integer number r=ctoi(a[i])+ctoi(b[i])+ctoi(t[i]), where the function ctoi( ) converts the character saved in its argument into an integer. Save r into a string s of length 2, where s[0]='0' if r is a single digited integer number, else s[0] contains the digit in the ten's position of r.
8. In step 530, copy s[0] in t[i−1] and s[1] into t[i].
9. In step 540, decrease the index i by 1 and repeat steps 520 to 540 while i>0 in step 550.
10. In step 560, shift the blocks of characters a[2] to a[n−d], b[2] to b[n−d], and t[1] to t[n−d], to the left by one character, following which at a[n−d], b[n−d], t[n−d] place a decimal character. Bring a, b, t into the canonical form.
11. In step 570, the final result of the addition of a and b is now in t.

If the given numbers a and b are negative, then steps 410 to 570 are modified as follows: the character '+' in a, b, and t is replaced by the character '−' and this change is followed through in the subsequent steps.

On the other hand, if a and b carry opposite signs, then change the sign of b and invoke the binary subtraction operation on a and b described below. The final result in t will have the correct sign. Change the sign of b to return the number to its original sign.

Binary Subtraction Operator (−)

FIGS. 6 to 9 represent an algorithm for performing binary subtraction. In step 610, two non-negative numbers a and b are considered. These numbers are formatted in the canonical form in step 620, and padded as outlined above in the case of the binary addition operator, in step 630. On these padded forms carry out the following steps:

1. If a=0 in step 640, return −b as the result in step 650. If b=0 in step 660, return a as the result in step 670. If a≠0 and b≠0, then step 680 is performed.
2. In step 680, create a temporary character string t of size=strlen(a)+1 such that t begins at t[0] and ends at t[n+1]. Fill t with zero characters except for the rightmost character, namely t[n+1], which is filled with the end-of-string character. Separately, save the relative location d of the decimal point with respect to the last digital character after the decimal point in the string of either a (or equivalently, of b).
3. In step 710, shift the block of characters between the decimal point and the sign of a by one character to the right. This overwrites the decimal point. Put a zero character in the vacated place immediately after the sign character of a. Do likewise for b. Put swap=false.
4. If b is larger than a in step 720, exchange the contents of a and b in step 730 (in C++ programming language this can be done by switching the pointers of a and b). Put swap=true.
5. Put i=n in step 740, following either step 720 or step 730.
6. If the numbers representing a, b, and t are now placed one below the other, they appear as shown below (in this case after the contents of a and b have been exchanged)

| | |
|---|---|
| +01211400 | → a |
| +00042128 | → b |
| 000000000 | → t |

Let n+1 be the number of characters in a sequentially identifiable as a[0], a[1], a[n], where a[0] contains the sign of a, and a[1] to a[n] contain its digits. Likewise b[0] contains the sign of b, and b[1] to b[n] contain its digits. Finally, t[0] to t[n] contain only zeros. Each of a[n+1], b[n+1], t[n+1] contains the end-of-string character.

7. Do one of the following computations:
   (a) If ctoi(a[i])≧ctoi(b[i]) in step 810, compute the integer number r=ctoi(a[i])−ctoi(b[i]), and put r (this will be a single digit) as a character in t[i] in step 830.
   (b) If ctoi(a[i])<ctoi(b[i]) in step 810, perform step 820 as follows. Compute the integer number r=10+ctoi (a[i])−ctoi(b[i]). Put r (this will be a single digit) as a character in t[i]. Put j=i−1. If the digit saved in a[j] in step 822 is greater than 0 reduce that digit by 1 in step 828; else change that digit to 9 in step 824 and continue repeating this else-substep by reducing j by 1 in step 826 at every repetition till the digit in a[j] is greater than 0 in step 822. This repetitive else-substep is guaranteed to stop correctly since a ≧b.

In step 840, decrease the index i by 1 and repeat steps 810 to 840 while i>0 in step 850.

8. If swap=true in step 910 (that is, if a and b were exchanged following step 720), put the character '−' in t[0] in step 920 and exchange the contents of a and b once again in step 930 and proceed to step 950. If swap=false, put the character '+' in t[0] in step 940 and proceed to step 950.
9. In step 950, shift the blocks of characters a[2] to a[n−d], b[2] to b[n−d], and t[2] to i[n−d], to the left by one character, following which at a[n−d], b[n−d], t[n−d] place a decimal character.
10. In step 960, bring a, b, t into the canonical form.
11. In step 970, the final result of the subtraction of b from a is now in t.

If the given numbers a and b are negative, then both their signs are changed to '+' before executing step 610 and, at the end of step 970, the signs of a, b, and t are also changed. If a and b carry opposite signs, then change the sign of b and invoke the binary addition operation on a and b described above. The final result in t will have the correct sign. Change the sign of b to return the number to its original sign.

Binary Multiplication Operator (*)

Figure 10:
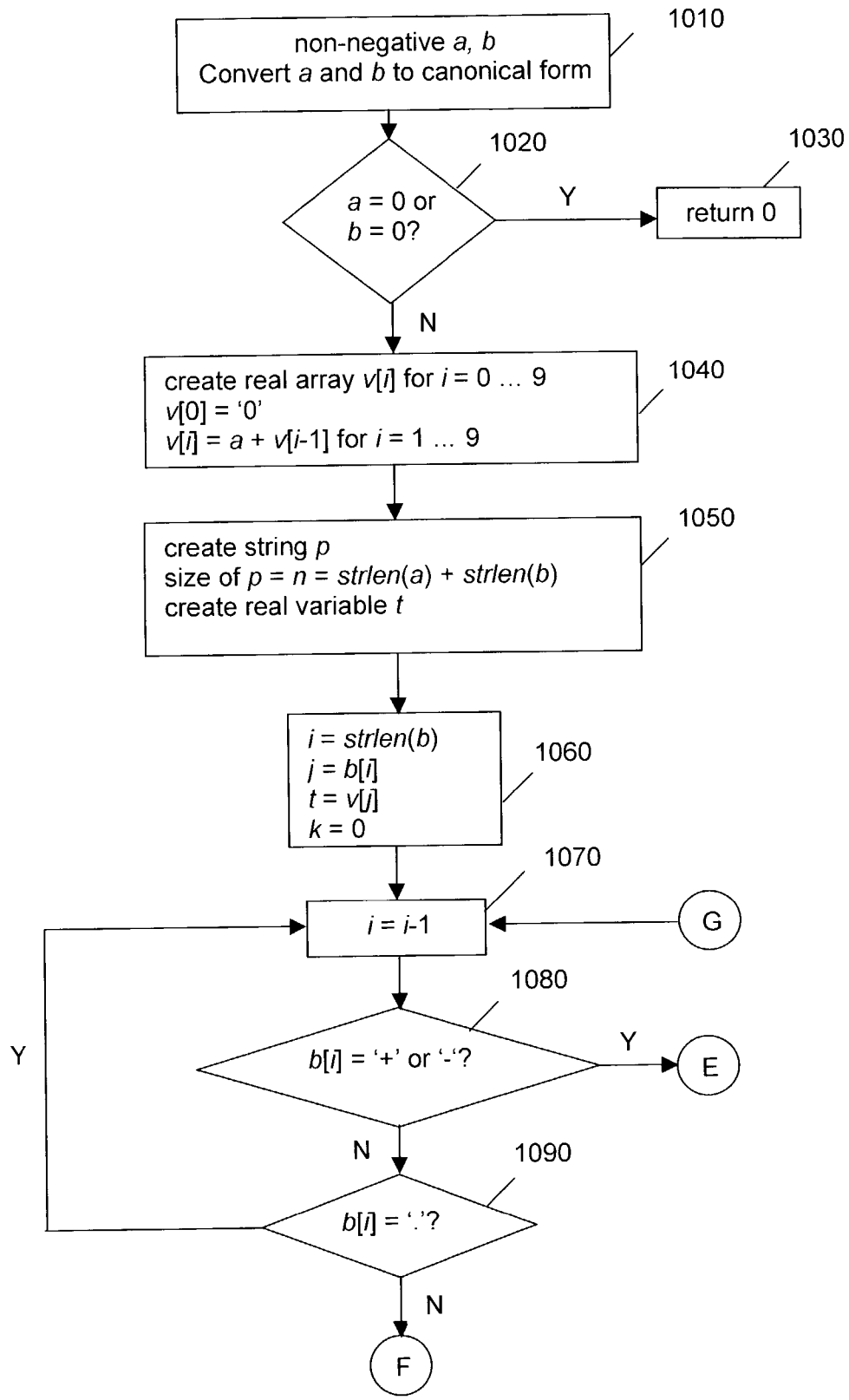
FIGS. 10 and 11 jointly form a flowchart of an algorithm for a binary multiplication operation for two terminating decimal numbers.
Figure 11:
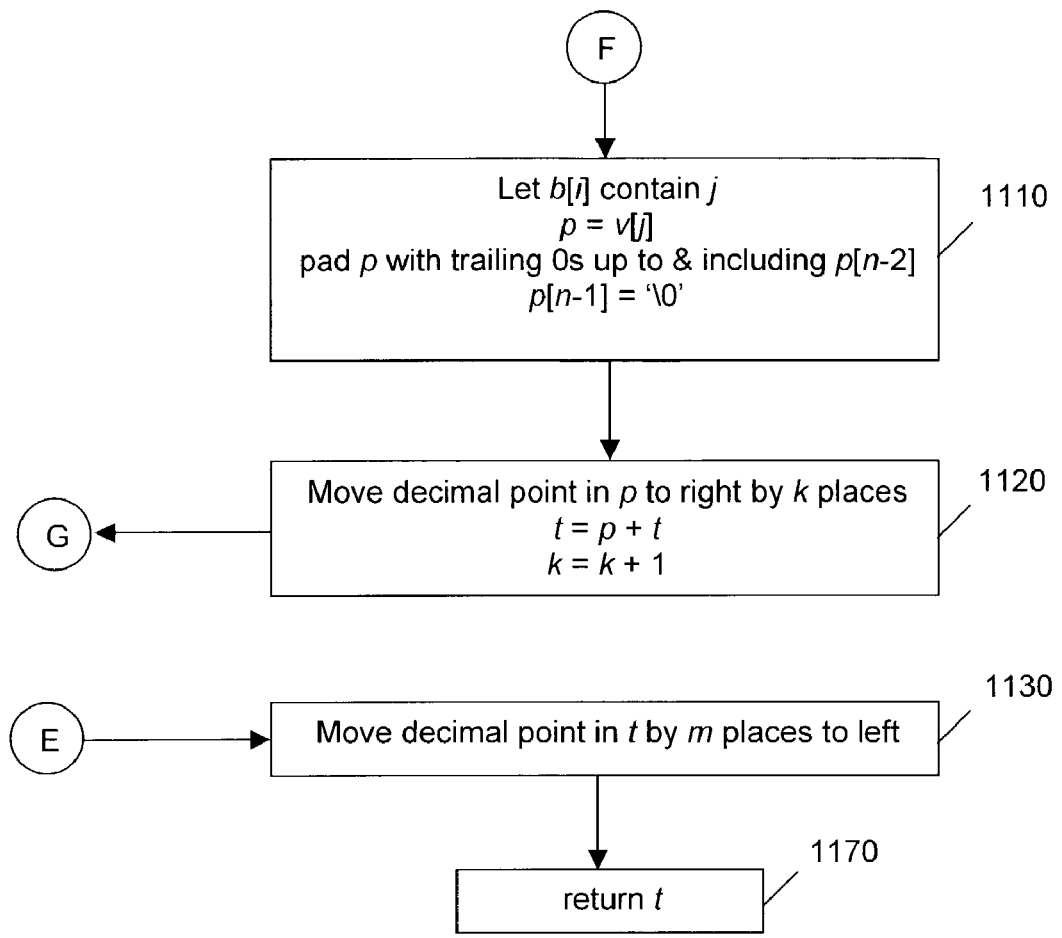
Figure 12:
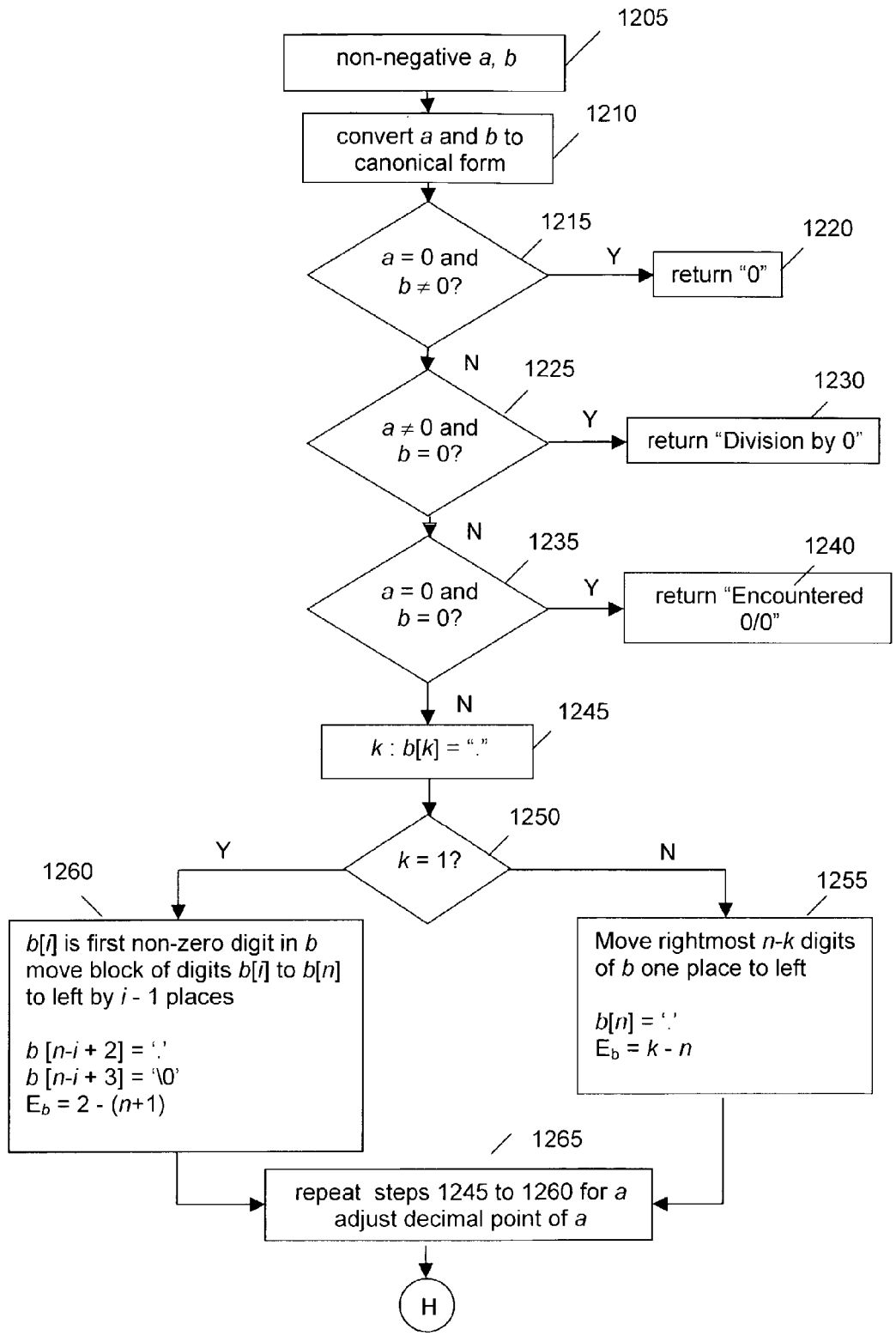
FIGS. 12 to 15 jointly form a flowchart of an algorithm for a binary division operation for two terminating decimal numbers.
Figure 13:
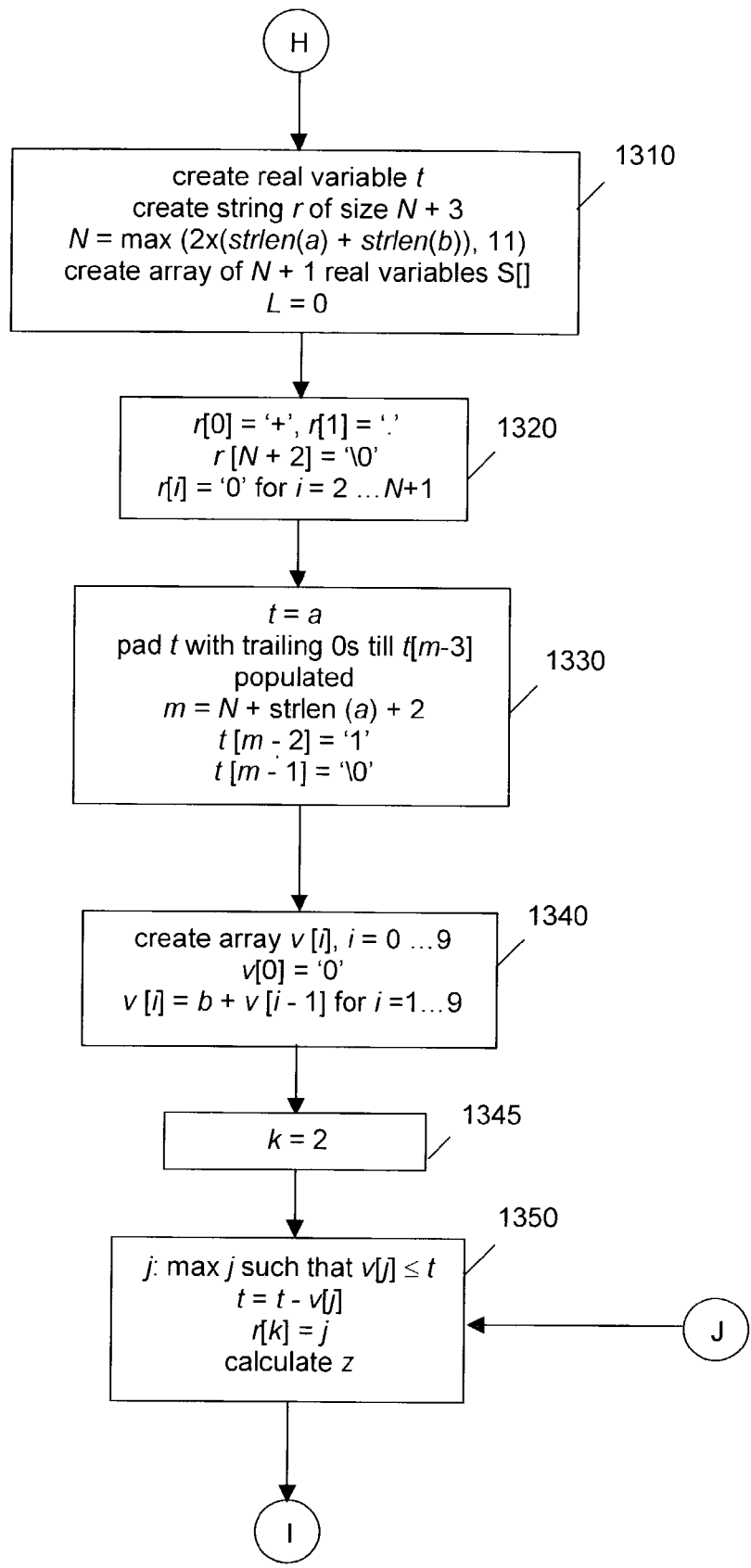
Figure 14:
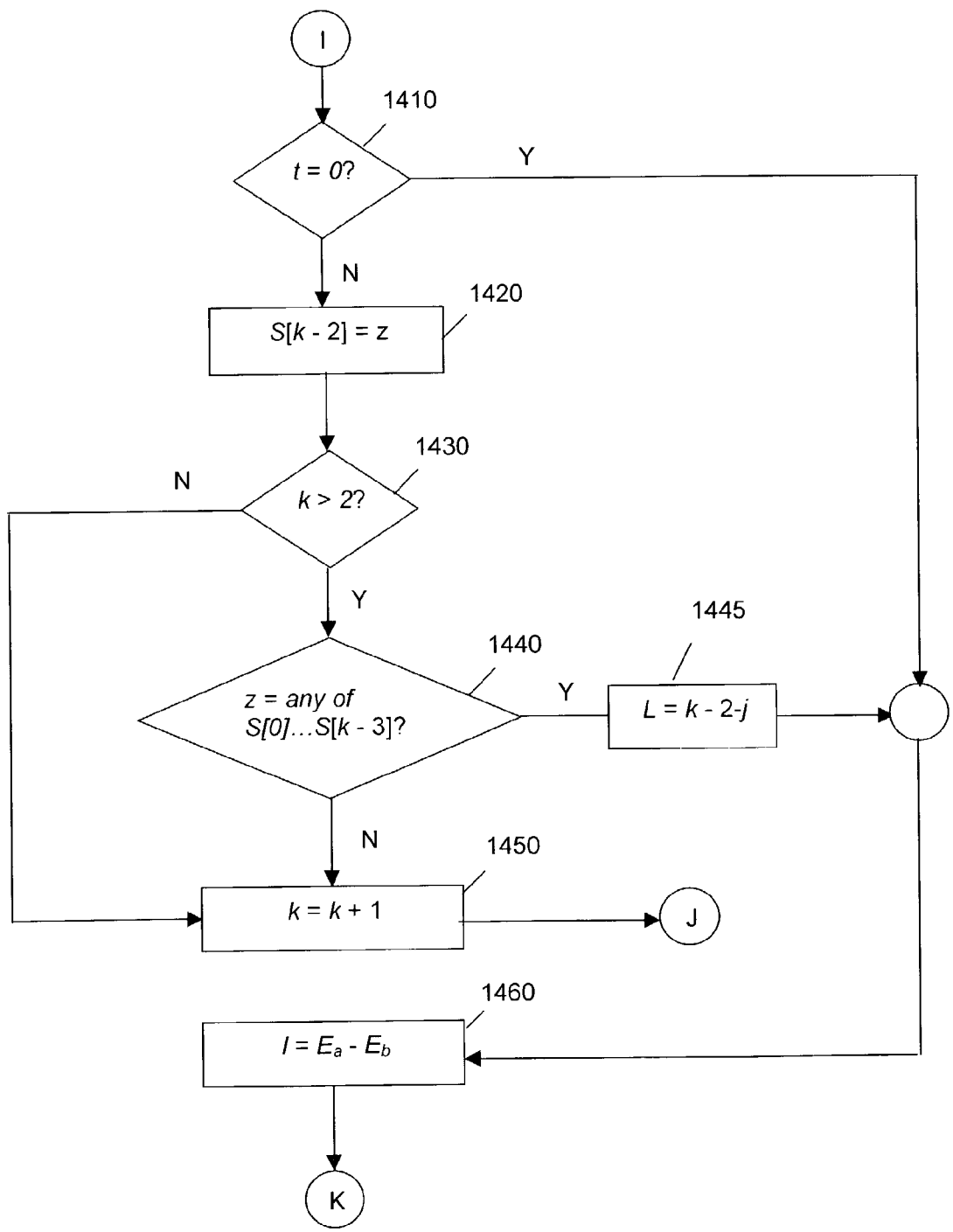
Figure 15:
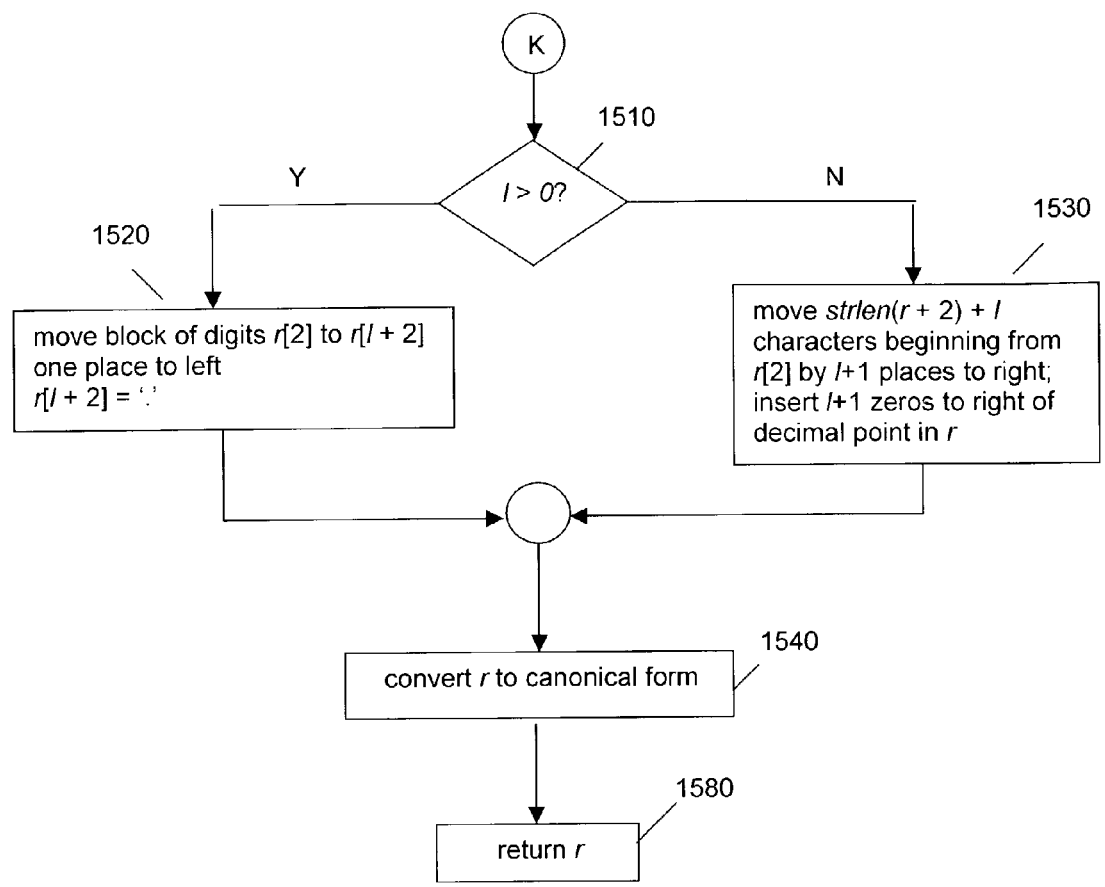
Figure 16:
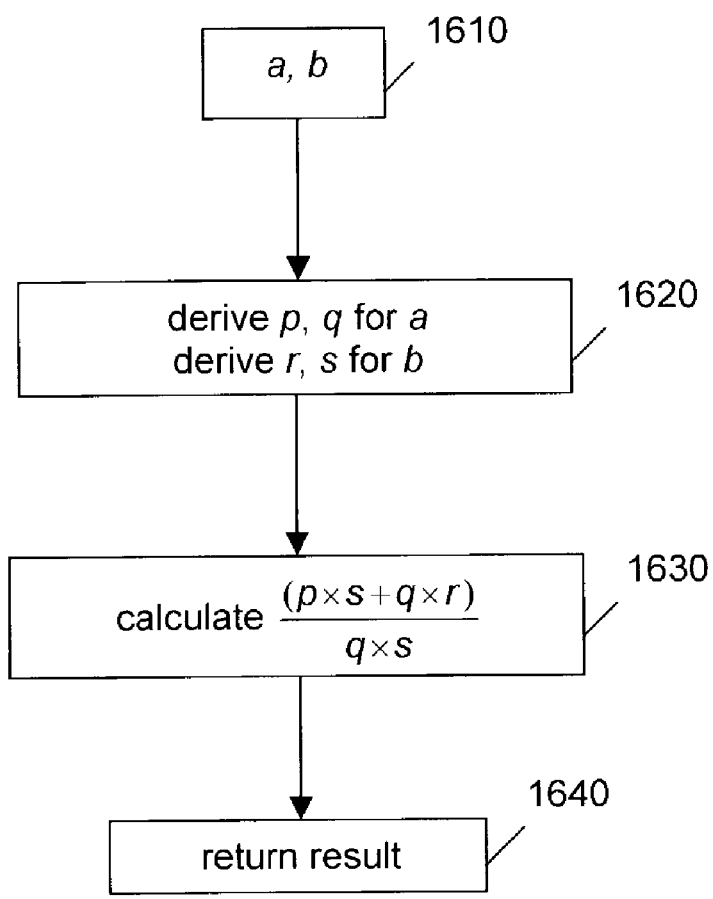
FIG. 16 is a flowchart of an algorithm for a binary addition operation for one or two repeating numbers.
Figure 17:
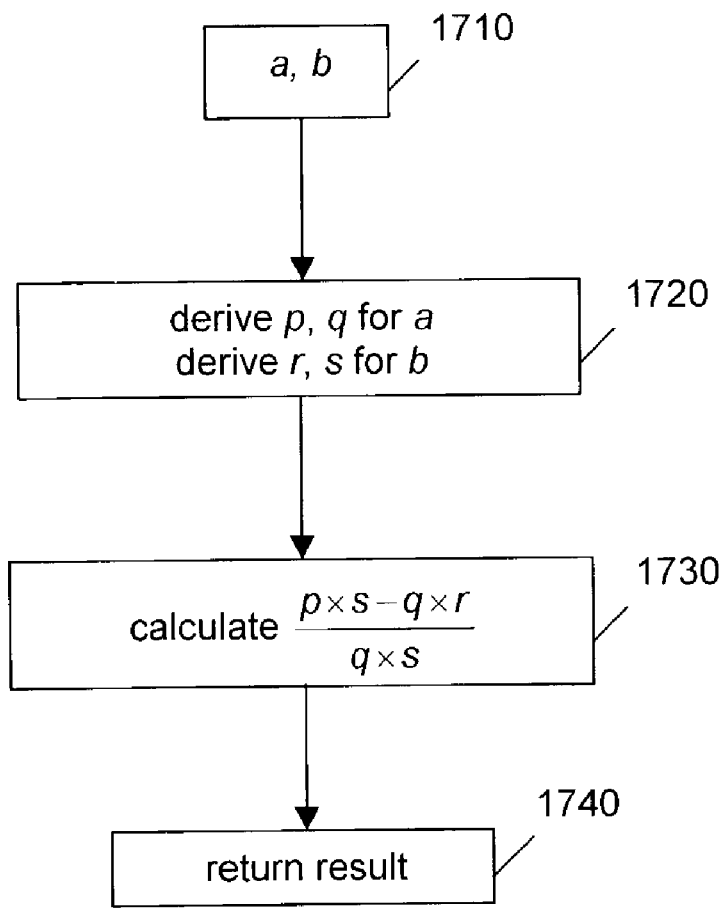
FIG. 17 is a flowchart of an algorithm for a binary subtraction operation for one or two repeating numbers.
Figure 18:
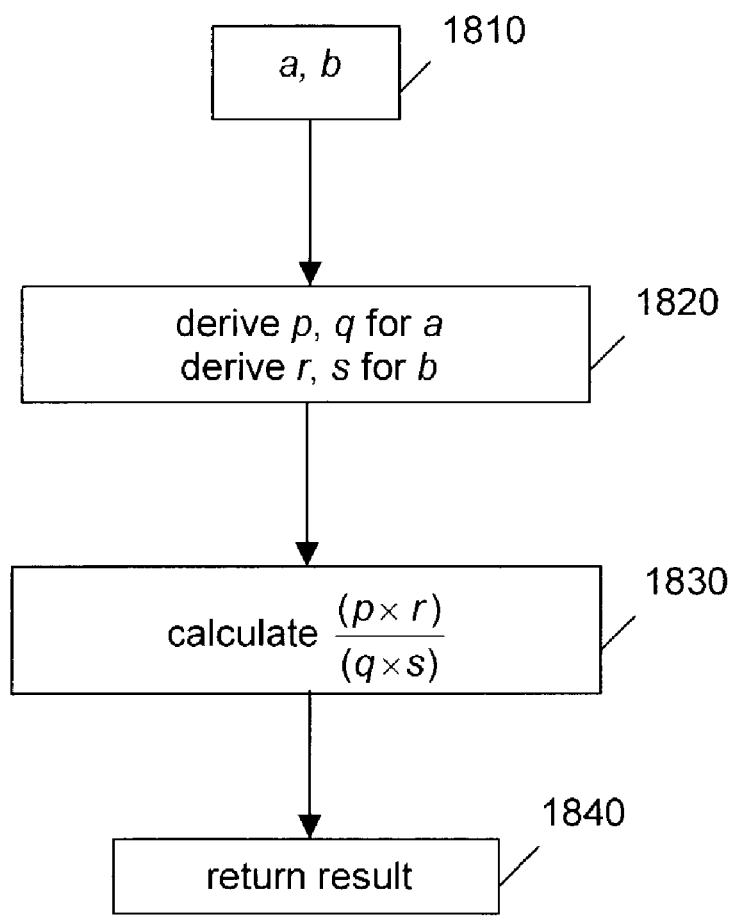
FIG. 18 is a flowchart of an algorithm for a binary multiplication operation for one or two repeating numbers.
Figure 19:
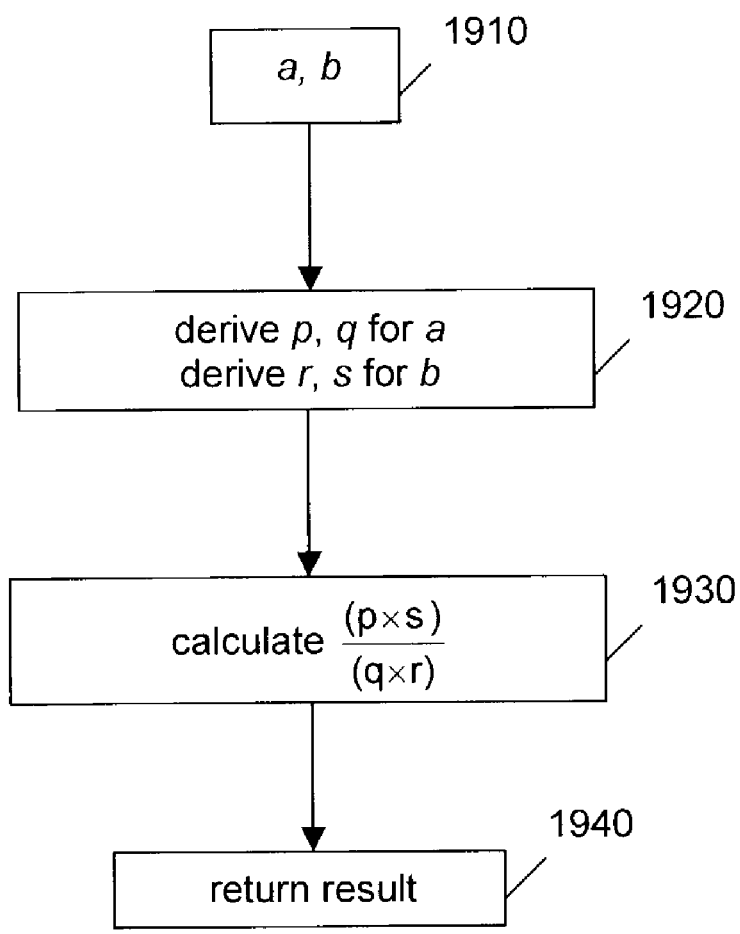
FIG. 19 is a flowchart of an algorithm for a binary division operation for one or two repeating numbers.

FIGS. 10 and 11 represent an algorithm for performing binary multiplication. Two non-negative numbers a and b are considered in step 1010, and formatted in the canonical form described above. On these formatted forms the following steps are performed:

1. If either a=0 or b=0 in step 1020, return a positively signed zero as the result in step 1030.
2. In step 1040, create an array of real variables v[i], i=0, 1, ..., 9, where v[0]="0", and v[i]=a+v[i−1] for i=1, ..., 9. The binary addition operator described above can be used to calculate a+v[i−1].
3. In step 1050, create a temporary character string p of size n=strlen(a)+strlen(b) to store intermediate results of a*b. Create a temporary real variable t to store a number.
4. In step 1060, put the index i=strlen(b). Let b[i] contain the digit j. Copy v[j] into t. Put the index k=0.
5. In step 1070, decrease i by 1. If b[i] contains a sign in step 1080, then perform step 1130.
6. If b[i] contains a decimal point in step 1090, then go to step 1070.
7. In step 1110, let b[i] contain j. Copy v[j] into p and pad p with trailing zeros up to and including p[n−2]. p[n−1] is filled with the end-of-string character.
8. In step 1120, move the decimal point in p to the right by k places (that is, multiply p by $10^k$). Add p and t and save the result in t. Increment k by 1, and perform step 1070.
9. In step 1130, move the decimal point in t by m places to the left, where m is the number of digits that appear to the right of the decimal point in b.
10. In step 1170, the final result of the multiplication of a and b is now in t.

If the given numbers a and b are both negative, then their signs are changed to '+' before executing step 1010, and at the end of step 1170 the signs of a and b are changed back to '−'. If a and b have opposite signs, then whichever has the negative sign, its sign is changed to '+' before executing step 1010. At the end of step 170, the sign of t is changed and the number whose sign was changed to '+' before executing step 1010 is changed back to '−'.

Binary Division Operator (/)

FIGS. 12 to 15 represent an algorithm for performing a binary division operation. Two non-negative numbers a and b are considered in step 1205, and formatted in the canonical form described above in step 1210. On these formatted forms the following steps are performed:

1. If a=0 and b≠0 in step 1215, return a positive zero as the result in step 1220. If a≠0 and b=0 in step 1225, return an error message "Division by 0" in step 1230. If a=0 and b=0 in step 1235, return an error message "Encountered 0/0" in step 1240. If none of the above conditions are true, perform step 1245.
2. Let b[n] carry the last non-null character (this will be either a digit or a decimal point) of b. Determine k in step 1245 such that b[k] is a decimal point for b. Note that k can be a value from 1 to n. Further, n is at least 2 since at this stage neither a nor b have zero value, and b[n+1]='\0'.
   (a) If k≠1 in step 1250, perform step 1255. Move the block of n−k digits beginning at b[k+1] one place to the left and put b[n]='.'. (No digits are moved if n−k=0.) Put $E_b$=k−n. The original b can be obtained by multiplying the current b with $10^y$, where y=$E_b$.
   (b) If k=1 in step 1250, perform step 1260. Let b[i] be the first non-zero digit in b. (i is thus ≧2, since b[0] contains the sign and b[1] contains the decimal point.) Move the block of digits b[i] to b[n] to the left by i−1 places. Put b[n−i+2]='.' and b[n−i+3]='\0'. Put $E_b$=2−(n+1). Note that the original b can be obtained by multiplying the current b with $10^y$, where y=$E_b$.
3. In step 1265, repeat equivalent steps 1245, 1250, 1255, 1260 by replacing b with a. Note that $E_b$ will become $E_a$. If now a has k digits more to the left of its decimal point than b has to its respective decimal point, then move the decimal point of a by k positions to the left, and increment $E_a$ by k.
4. In step 1310, create a real variable t. Create a character string r of size N+3, where N is sufficiently long (expediently specified by the user, since an algorithmic determination is not straight forward to provide) to hold the result of a/b in string form. Create an array of N+1 real variables S[ ] to hold intermediate results of the division process. In the described implementation N=max(2*(strlen(a)+strlen(b)), 11) is used. Put L=0. Later, L will hold the length of the repeating block of digits in the result, if the result turns out to be a repeating numeral. Thus L serves as the flag to indicate if a decimal numeral is a repeating numeral.
5. In step 1320, put r[0]="+", r[1]=".", and r[N+2]="\0", the end-of-string character. Fill the rest of r with "0"s.
6. In step 1330, copy a into t and pad t with trailing zeros till t[m−3] is populated, where m=N+strlen(a)+2. Put t[m−2]='1', and t[m−1]='\0'. Putting t[m−2]="1" is a trick used to facilitate step 1350.
7. In step 1340, create an array of variables v[i], i=0, 1, ... 9, where v[0]="0", and v[i]=b+v[i−1] for i=1, ..., 9. The binary addition operator described above can be used to calculate b+v[i−1].
8. In step 1345, put k=2. k is the index used to populate r with the result of a/b during the computation process. Since r[0] and r[1] have been populated in step 1320, further population of r is from r[2] onwards till r[N+2] is reached.
9. In step 1350, find the largest index j (from 0 to 9) such that v[j]≦t and calculate t−v[j] and save the result in t. Further, save the index j as a character in r[k]. The trick of putting '1' in t[m−2] in step 1330, is used to prevent the unnecessary steps of bringing the result of subtraction to a canonical form if the result has trailing zeros, and repadding it in the next iteration when step 1350 is reexecuted after k is incremented in step 1450.
10. In step 1410, check if, with the trick '1' changed to '0' in t, t=0. This is easily done by copying t into a temporary variable, say, z and by replacing the rightmost "1" by "0", and formatting z to its canonical form. If now z "+." then t=0. If t=0, processing proceeds to step 1460.
11. If t is not equal to 0, save z in the real variable S[k−2] in step 1420. Note that z is the remainder that results from the subtraction process t−v[j] if the trick '1' had not been placed in t. Therefore, z is the true remainder of step 1350.
12. If k=2 (that is, its minimum value; k is never less than 2), go to step 1450.
13. If k>2 in step 1430, check if z matches with any of the elements of S from S[0] to S[k−3] in step 1440. If a match occurs, for example, with S[j], then successive iterations clearly only cyclically repeat the results from S[j+1] to S[k−2]. Put the length of the repeating block of digits L=k−2−j in step 1445 and go to step 1460. Note that a non-zero L indicates that the result is a repeating numeral.
14. If k>2 in step 1430 and z does not match with any element of S, go to step 1450.

15. Increment k by 1 in step 1450, and return to 1350.

16. Let $l=E_a-E_b$ in step 1460. Note that r[1]. "." and that r has extra trailing zeros because of initialization of r in step 1320. If $l \geqq 0$ in step 1510, move the block of digits r[2] to r[l+2], by one place to the left and put r[l+2]="." in step 1520. After this operation the current number in r is now the earlier number saved in r multplied by $10^{l+1}$. If l<0 in step 1510, move strlen(r+2)+l characters (strlen(r+2)+l<strlen(r+2) because l<0), beginning from r[2], by l+1 places to the right to make place to insert l+1 zeros immediately to the right of the decimal point in r in step 1530. This is possible because r has trailing zeros if N is large enough. Insert the l+1 zeros. Note that after this operation the current number in r is the earlier number saved in r multplied by $10^{l+1}$. Bring r to the canonical form in step 1540. In step 1580, the final result of the division of a by b is now in r.

If the given numbers a and h are both negative before executing step 1205, then their signs are changed to '+' before executing step 1205. After executing step 1580, change the signs of a and b back to '−'.

If a and b have opposite signs before executing step 1205, then whichever has the negative sign, its sign is changed to '+' before executing step 1205. At the end of step 1580, the sign of r is changed to '−' and the number whose sign was changed to '+' before executing step 1205 is changed back to '−'.

Arithmetic Operators for Repeating Numerals

The binary arithmetic operations described above are exact only if both a and b are terminating numerals. To maintain the desired accuracy when one or both of a and h are repeating numerals, their rational fraction representations are necessarily used to perform arithmetical operations on a and b.

The manner in which a decimal numeral can be converted into a rational fraction is described above in the subsection entitled "Converting a decimal number to a rational fraction".

Conversion of a rational fraction p/q to a decimal numeral is a relatively straightforward process. Given p and q, the binary division operator described above can be used for such conversions. In the following, all the binary arithmetic operators involved in the calculations are those already described above.

In the operations outlined below, a first step 1610, 1710, 1810 and 1910 involves receiving input numbers a and b involved in an arithmetic operation. A second step 1620, 1720, 1820 and 1920 involves deriving numerators p, r and denominators q, s for respective numbers a and b for rational fraction representations of the form a=p/q and b=r/s. After a third processing step, which differs for each operation, a result is returned in a fourth final step 1640, 1740, 1840 and 1940.

Binary Addition

Let a p/q and b=r/s. Then a+b can be computed by calculating (p*s+q*r)/(q*s) in step 1630.

Binary Subtraction

Let a p/q and b=r/s. Then a−b can be computed by calculating (p*s−q*r)/(q*s) in step 1730.

Binary Multiplication

Let a=p/q and b=r/s. Then a*b can be computed by calculating (p*r)/(q*s) in step 1830.

Binary Division

Let a=p/q and b=r/s. Then a/b can be computed by calculating (p*s)/(q*r) in step 1930.

The result of the above operations is the accurate decimal numeral form.

Relational Operators

Figure 20:
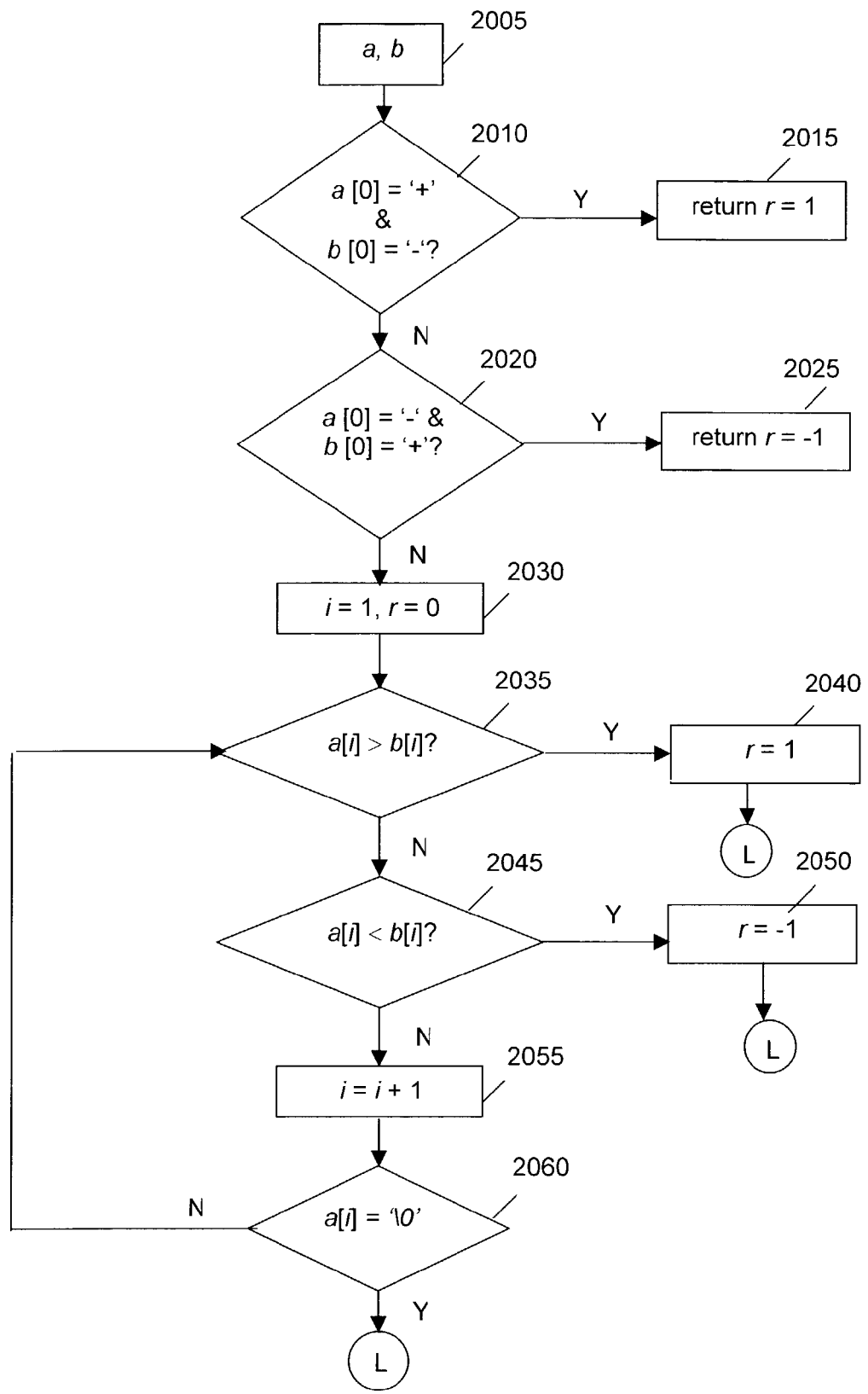
FIGS. 20 and 21 jointly form a flowchart of an algorithm for comparing two numbers
Figure 21:
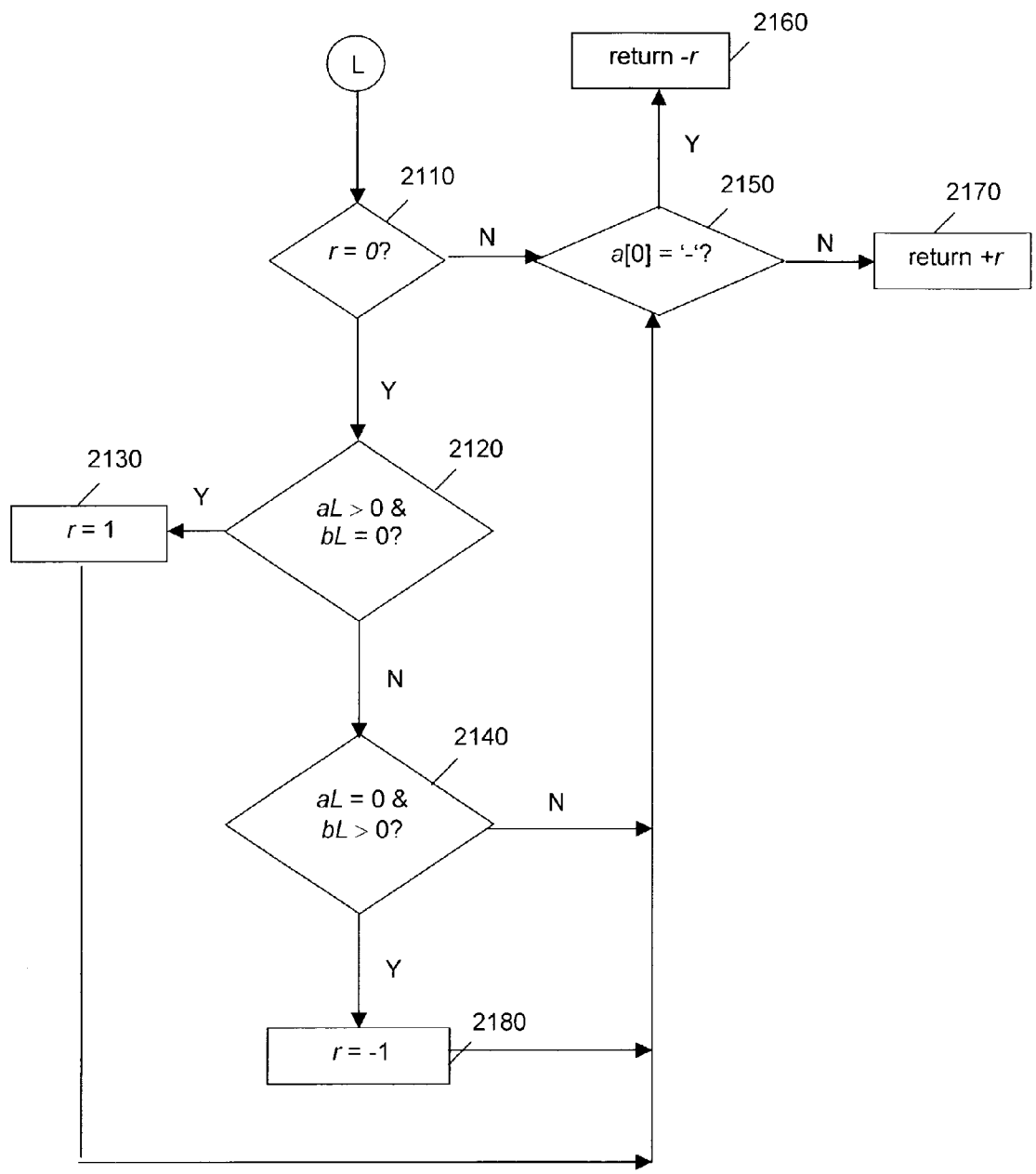

The relational operators require a comparison between two numbers, a and b. FIGS. 20 and 21 schematically represent the procedure involved in such a comparison. To carry out the comparison, take two numbers a and b in step 2005 and format and pad (with minimal padding) a and b so that a and b are of the same size and their decimal points are aligned. Choose the appropriate padding technique for each number according to whether the number is a terminating or a repeating numeral. A simple code fragment in C++ then performs the comparison, character by character on a and b until a conclusion can be made. FIG. 24 provides an example of appropriate code.

As may be noted from the code fragment in FIG. 24, both terminating and repeating numerals are taken care of. The relational operator functions check the value of r returned by the code fragment above and accordingly return TRUE or FALSE as the result. The value returned in r is 0 if a=b, −1 if a<b, and +1 if a>b.

In step 2010, if a[0]='+' and b[0]='−', return "1" in step 2015, indicating that a is greater than b. Otherwise, check whether the converse is true in step 2020. If so, return "−1" in step 2025, indicating that b is greater than a.

In step 2030, set i=1, r=0. Check whether a[i] is greater than b[i] in step 2035. If so, set r=1 in step 2040 and go to step 2110. Otherwise, check whether a[i] is less than b[i] in step 2045. If so, set r=−1 in step 2050 and go to step 2110. If the result of step 2045 is false, increment index i in step 2055. If a[i] does not contain end-of-string character in step 2060, return to step 2035. Otherwise, proceed to step 2110.

Check whether r=0 in step 2110. If yes, whether aL is greater than zero and bL equals zero in step 2120. If both conditions are true, set r=1 in step 2130 and proceed to step 2150. If r≠0, proceed to step 2150.

If the result of step 2120 is false, a check is made in step 2140 of whether aL equals zero, and bL is greater than zero. If so, set r=−1 in step 2180 and proceed to step 2150. Otherwise, proceed to step 2150 directly.

If in step 2150, a[0]='−', return r with a change in sign in step 2160. Otherwise, the existing result r is returned in step 2070.

Computer Hardware and Software

Figure 22:
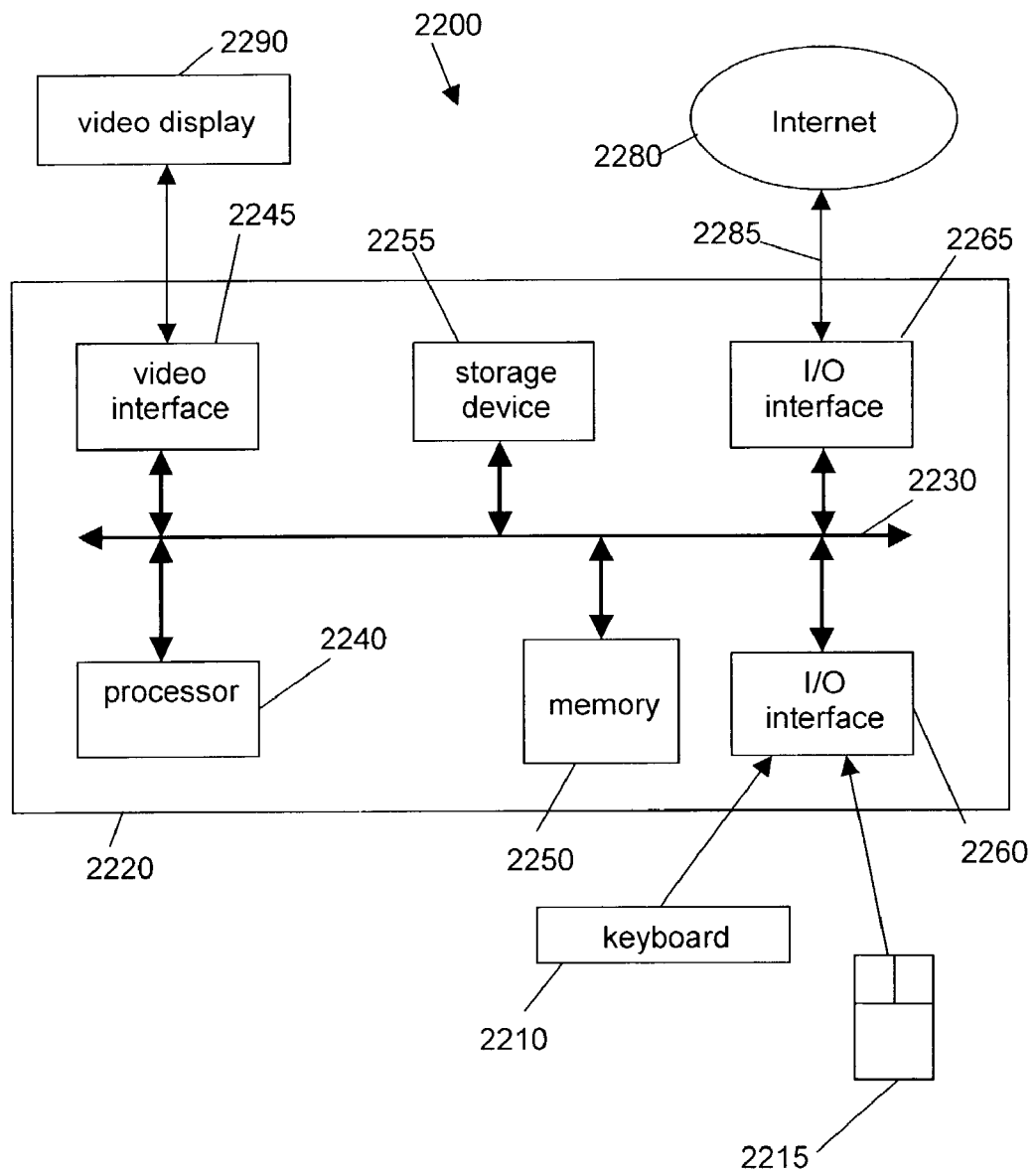
FIG. 22 is a schematic representation of a computer system suitable for executing computer software for performing the techniques described herein.

FIG. 22 is a schematic representation of a computer system 2200 that can be used to perform steps in a process which implements the techniques described herein. The computer system 2200 is provided for executing computer software that is programmed to assist in performing the described techniques. This computer software executes under a suitable operating system installed on the computer system 2200.

The computer software involves a set of programmed logic instructions that are able to be interpreted by the computer system 2200 for instructing the computer system 2200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software, which has a binary format suitable for execution, by the operating system. The computer software is programmed in a manner that involves various software components, or code means, that perform particular steps in the process of the described techniques.

The components of the computer system 2200 include: a computer 2220, input devices keyboard 2210, mouse 2215 and video display 2290. The computer 2220 includes: processor 2240, memory module 2250, input/output (I/O) interfaces 2260, 2265, video interface 2245, and storage device 2255.

The processor 2240 is a central processing unit (CPU) that executes the operating system and the computer software executing under the operating system. The memory module 2250 include random access memory (RAM) and read-only memory (ROM), and is used under direction of the processor 2240.

The video interface 2245 is connected to video display 2290 and provides video signals for display on the video display 2290. User input to operate the computer 2220 is provided from input devices 2210, 2215 consisting of keyboard 2210 and mouse 2215. The storage device 2255 can include a disk drive or any other suitable non-volatile storage medium.

Each of the components of the computer 2220 is connected to a bus 2230 that includes data, address, and control buses, to allow these components to communicate with each other via the bus 2230.

The computer system 2200 can be connected to one or more other similar computers via a input/output (I/O) interface 2265 using a communication channel 2285 to a network 2280, represented as the Internet.

The computer software program may be provided as a computer program product, and recorded on a portable storage medium. In this case the computer software program is accessed by the computer system 2200 from the storage device 2255. Alternatively, the computer software can be accessed directly from the network 2280 by the computer 2220. In either case, a user can interact with the computer system 2200 using the keyboard 2210 and mouse 2215 to operate the programmed computer software executing on the computer 2220.

The computer system 2200 is described for illustrative purposes: other configurations or types of computer systems can be equally well used to implement the described techniques. The foregoing is only an example of a particular type of computer system suitable for implementing the described techniques.

Conclusion

An accurate computer implementable method is described herein for performing arithmetical and relational operations on decimal numerals of arbitrary size.

Various alterations and modifications can be made to the techniques and arrangements described herein, as would be apparent to one skilled in the relevant art.

I claim:

1. Computer software for performing an arithmetic or relational operation, the computer software including program code recorded on a medium and capable of execution by a computer system able to interpret the program code, the computer software comprising:

program code for providing a number as an argument to an arithmetic or relational operation;

program code for formatting said number in a predetermined canonical form;

program code for representing said number as a character-based strings in a computer system; and program code for performing a predetermined operation involving said character-based strings to generate a result of said arithmetic or relational operation involving said argument.

2. The computer software of claim 1, wherein the program code includes:

program code for returning a result of said arithmetic operation in a string-based string variable.

3. The computer software of claim 1, wherein the program code includes:

program code for returning a result of said relational operation in a Boolean logic variable.

4. The computer software of claim 1, wherein the program code includes:

program code for converting said result from a character-based string to a number variable.

5. The computer software of claim 4, wherein said number variable is of type real.

6. The computer software of claim 1, wherein the program codes includes:

program code for determining whether said number is a terminating or recurring number.

7. The computer software of claim 6, wherein the program codes includes:

program code for determining respective rational fraction representations of a recurring number provided as an argument to an arithmetic operation; and program code for performing supplementary predetermined operations that supplement said predetermined operations, to take into account the rational fraction representations;

wherein the numerator and the denominator of said rational fraction operations are formatted in said predetermined canonical form.

8. The computer software of claim 1, wherein said arithmetic operation is one of: addition, subtraction, multiplication and division.

9. The computer software of claim 1, wherein said predetermined canonical form comprises a sign, followed by an arbitrary (none, one or more) number of significant digits followed by a decimal point followed by an arbitrary (none, one or more) number of significant digits.

10. The computer software of claim 9, wherein said arbitrary number of digits may be padded with zero digits to align pairs of formatted numbers used as arguments in arithmetic or relational operations.

11. The computer software of claim 1, wherein said number is in decimal form or fractional form.

12. A computer system for performing an arithmetic or relational operation, the computer system comprising:

a storage device having program code stored on a computer usable medium of the storage device;

a processor for executing the program code of the computer usable medium, wherein the program code includes:

program code for providing a number as an argument to an arithmetic or relational operation;

program code for formatting said number in a predetermined canonical form;

representing said number as a character-based string in said computer system; and program code for performing a predetermined operation involving said character-based string to generate a result of said arithmetic or relational operation involving said argument.

13. The computer system of claim 12, wherein the program code includes:
program code for returning a result of said arithmetic operation in a string-based string variable.

14. The computer system of claim 12, wherein the program code includes:
program code for returning a result of said relational operation in a Boolean logic variable.

15. The computer system of claim 12, wherein the program code includes:
program code for converting said result from a character-based string to a number variable.

16. The computer system of claim 15, wherein said number variable is of type real.

17. The computer system of claim 12, wherein the program codes includes:
program code for determining whether said number is a terminating or recurring number.

18. The computer system of claim 7, wherein the program codes includes:
program code for determining respective rational fraction representations of a recurring number provided as an argument to an arithmetic operation; and
program code for performing supplementary predetermined operations that supplement said predetermined operations, to take into account the rational fraction representations;
wherein the numerator and the denominator of said rational fraction operations are formatted in said predetermined canonical form.

19. The computer system of claim 12, wherein said arithmetic operation is one of: addition, subtraction, multiplication and division.

20. The computer system of claim 12, wherein said predetermined canonical form comprises a sign, followed by an arbitrary (none, one or more) number of significant digits followed by a decimal point followed by an arbitrary (none, one or more) number of significant digits.

21. The computer system of claim 20, wherein said arbitrary number of digits may be padded with zero digits to align pairs of formatted numbers used as arguments in arithmetic or relational operations.

22. The computer system of claim 12, wherein said number is in decimal form or fractional form.

23. A method of performing an arithmetic or relational operation in a computer system, the method comprising the steps of:
reading program code by a processor of the computer system from a computer usable medium of a storage device and executing the program code by the processor, wherein executing the program code includes the steps of:
providing a number as an argument for an arithmetic or relational operation;
formatting said number in a predetermined canonical form;
representing said number as a character-based string in a computer system; and
performing a predetermined operation involving said character-based string to generate a result of said arithmetic or relational operation involving said argument.

* * * * *